(12) United States Patent
Kato et al.

(10) Patent No.: US 7,219,792 B2
(45) Date of Patent: May 22, 2007

(54) ARTICLE CARRYING APPARATUS

(75) Inventors: Heizaburo Kato, Shizuoka-ken (JP); Toshinao Kato, Shizuoka-ken (JP)

(73) Assignee: Sankyo Seisakusho Co., Tokyo (JP)

( * ) Notice: Subject to any disclaimer, the term of this patent is extended or adjusted under 35 U.S.C. 154(b) by 207 days.

(21) Appl. No.: 11/074,022

(22) Filed: Mar. 8, 2005

(65) Prior Publication Data

US 2005/0199472 A1    Sep. 15, 2005

(30) Foreign Application Priority Data

Mar. 9, 2004  (JP) ............................. 2004-066251
Nov. 15, 2004 (JP) ............................. 2004-330292

(51) Int. Cl.
*B65G 25/04* (2006.01)

(52) U.S. Cl. ............................. 198/750.14; 198/750.8; 198/753

(58) Field of Classification Search ............. 198/621.1, 198/750.1, 750.14, 750.3, 750.8, 752.1, 753
See application file for complete search history.

(56) References Cited

U.S. PATENT DOCUMENTS

| | | | | |
|---|---|---|---|---|
| 4,151,907 A | * | 5/1979 | Doty ........................ | 198/774.1 |
| 4,243,132 A | * | 1/1981 | Miyakoshi et al. ........... | 193/40 |
| 4,397,174 A | * | 8/1983 | Jungesjo ..................... | 72/419 |
| 4,403,907 A | * | 9/1983 | Koller et al. ............. | 414/744.3 |
| 4,436,199 A | | 3/1984 | Baba et al. | |
| 4,599,909 A | * | 7/1986 | Koller .......................... | 74/27 |
| 4,724,949 A | * | 2/1988 | Misina ..................... | 198/750.8 |
| 4,730,722 A | * | 3/1988 | Sandrock ................. | 198/774.3 |
| 4,838,411 A | * | 6/1989 | Rainey et al. ........... | 198/774.3 |
| 5,178,258 A | | 1/1993 | Smalley et al. | |
| RE34,581 E | * | 4/1994 | Sofy et al. ............... | 72/405.16 |
| 5,345,831 A | * | 9/1994 | Sandrock ........................ | 74/53 |
| 5,542,804 A | * | 8/1996 | Merkle et al. .............. | 414/165 |
| 6,371,282 B1 | * | 4/2002 | Brodin .................... | 198/750.1 |
| 6,598,733 B2 | * | 7/2003 | Kato ........................ | 198/750.1 |

(Continued)

FOREIGN PATENT DOCUMENTS

FR    2367542 A    5/1978

(Continued)

OTHER PUBLICATIONS

European Search Report dated Aug. 10, 2005.

*Primary Examiner*—Douglas A. Hess
(74) *Attorney, Agent, or Firm*—Morrison & Foerster LLP

(57) ABSTRACT

An article carrying apparatus for carrying, in a carrying direction, an article placed on a carry face of a carry section making use of a vibration, includes: the carry section provided with the carry face of which the carrying direction is linearly restricted; and a vibration applying mechanism that applies the vibration to the carry section. The vibration applying mechanism includes: a first cam mechanism for converting a motion that has been input from a predetermined drive source into a reciprocating linear motion in a first direction that has at least a component in the carrying direction, and for transmitting the reciprocating linear motion to the carry section; and a second cam mechanism for converting a motion that has been input from a predetermined drive source into a reciprocating linear motion in a second direction that has at least a component in a normal direction of the carry face, and for transmitting the reciprocating linear motion to the carry section.

17 Claims, 17 Drawing Sheets

U.S. PATENT DOCUMENTS 6,708,815 B2 *   3/2004   Kato ..................... 198/750.8
6,782,995 B2 *   8/2004   Didion et al. ............ 198/750.8

FOREIGN PATENT DOCUMENTS

| JP | 11-278634 A | 10/1999 |
| JP | 2003-40424  | 2/2003  |
| SU | 1105412 A1  | 7/1984  |

* cited by examiner bottom dead center top dead center

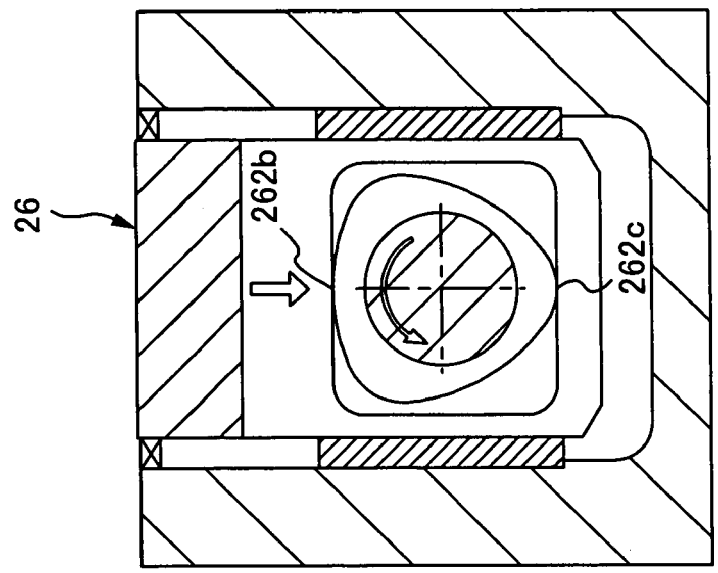
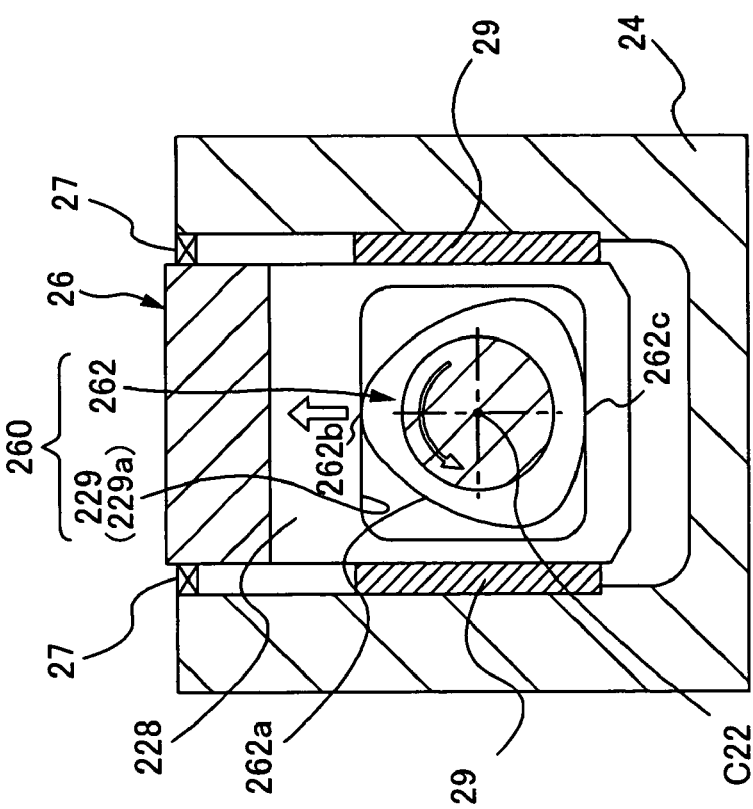

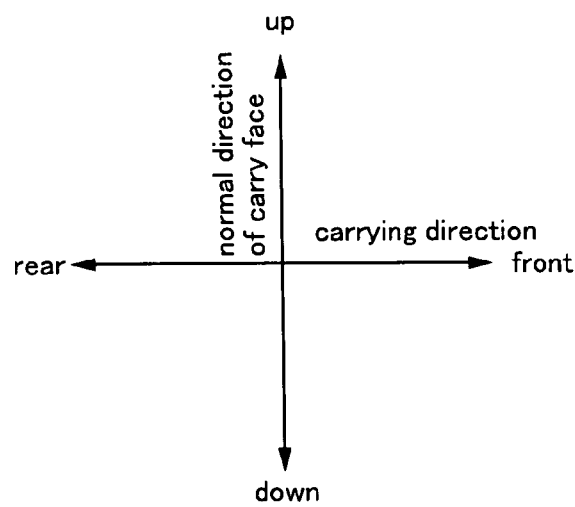
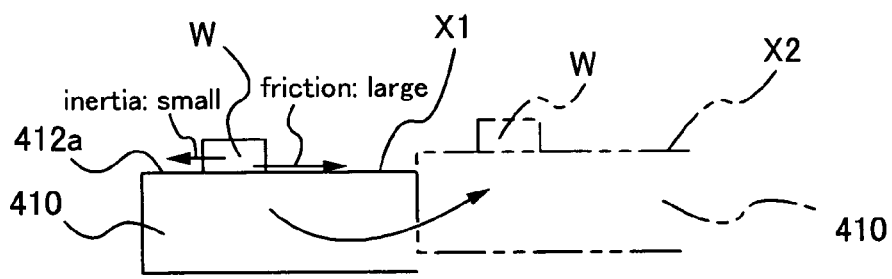
FIG. 15A
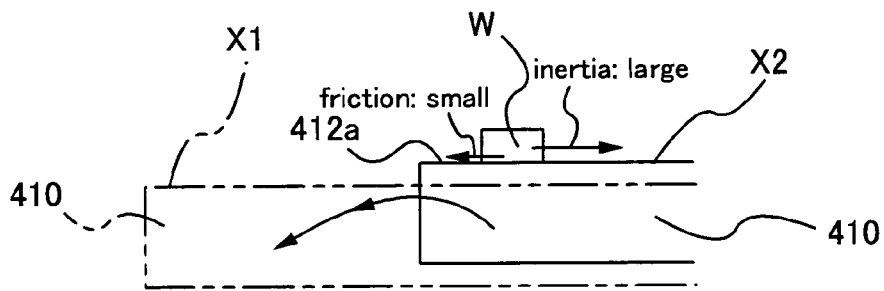
FIG. 15B
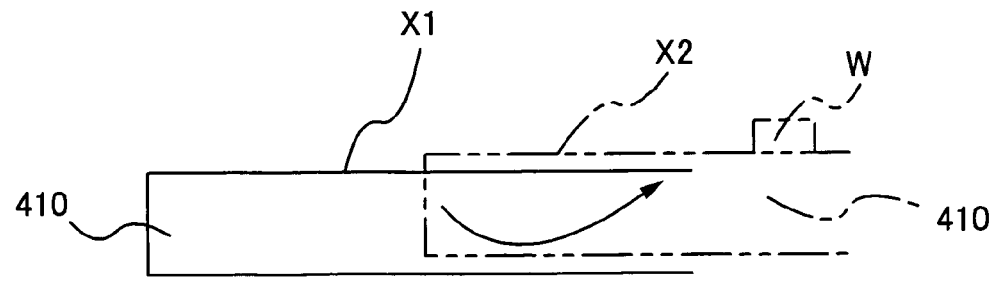
FIG. 15C

ARTICLE CARRYING APPARATUS

CROSS-REFERENCE TO RELATED APPLICATIONS

The present application claims priority upon Japanese Patent Application No. 2004-066251 filed on Mar. 9, 2004 and Japanese Patent Application No. 2004-330292 filed on Nov. 15, 2004, which are herein incorporated by reference.

BACKGROUND OF THE INVENTION

1. Field of the Invention

The present invention relates to article carrying apparatuses.

2. Description of the Related Art

Conventionally, various types of article carrying apparatuses for carrying articles such as bulk components while lining them in rows and supplying the articles one at a time have been proposed. Such apparatuses are generally called "feeders," and various types of feeders exist, including vibration- and belt-type feeders, although vibration-type feeders are the most common. A vibration-type feeder is an apparatus for carrying an article placed on a carry face, which vibrates, by making use of, for example, the phenomenon of relative sliding of the article with respect to the carry face.

One example of such a vibration-type feeder is a linear feeder that carries articles over a straight path. The carrying mechanism of such a linear feeder is described below with reference to FIG. 15A to FIG. 15C.

This feeder is provided with a carry section 410 having a carry face 412a whose carrying direction is linearly restricted, and the carry section 410 vibrates between a second position X2 and a first position X1 set in the front and the rear in the carrying direction (hereinafter, this is also referred to as "reciprocating movement"). As shown in FIG. 15A, when moving toward the forward second position X2 during reciprocating movement, relative sliding of the article W with respect to the carry face 412a is inhibited so that the article W moves together with the carry section 410, whereas as shown in FIG. 15B, when moving toward the rear first position X1, the article W slides relative to the carry face 412a and only the carry section 410 moves to the first position X1 while the article W remains at the forward second position X2. By repeating this reciprocating movement, as shown in FIG. 15C, the article W is fed forward with respect to the carry face 412a in small increments, thereby achieving carrying of the articles.

Methods for controlling the state of this relative sliding include a first method of changing the inertia that acts on the article W itself during reciprocating movement, and a second method of changing the friction that occurs between the article W and the carry face 412a during reciprocating movement.

The first method is achieved by using different acceleration amounts for the forward direction and the backward direction during reciprocating movement of the carry section 410 in the carrying direction. For example, as shown in FIG. 15A, the carry section 410 is moved to the forward second position X2 at as uniform a velocity as possible, thus reducing the rearward inertia that acts on the article W and allowing the article W to move together with the carry section 410 to the second position X2. In contrast, the carry section 410 is moved to the rear first position X1 with a large acceleration (see FIG. 15B), thus causing a large forward inertia to act on the article W that in turn causes the article W to remain at the second position X2 while only the carry section 410 moves to the first position X1.

On the other hand, the second method adds additional vibration, in the normal direction of the carry face 412a, to the carry section 410 (which is hereinafter also referred to as "reciprocating movement") as it moves back and forth in the carrying direction. For example, as shown in FIG. 15A, when moving to the forward second position X2, the carry section 410 is accelerated upward to increase friction and inhibit relative sliding. Conversely, as shown in FIG. 15B, the carry section 410 is accelerated downward when moving to the rear first position X1 to reduce friction and bring about relative sliding.

Ordinarily, these two methods are combined to effectively control relative sliding and thereby increase the carrying ability of the article carrying apparatus. In other words, the ability to carry the article W is increased by applying, to the carry section 410, vibration having a carrying-direction component in an inertia term and a normal-direction component in a friction term, and further, setting the motion path defining that vibration most suitably for the required specifications, such as the type of the article W to be carried and the carrying capacity.

Expanding upon the above discussion, the problems with such conventional linear feeders are examined below.

FIG. 16A and FIG. 16B respectively show a plan view and a lateral view of a linear feeder of a first conventional example. This feeder 501 is provided with a carry section 510 having a horizontal carry face 512a in which the carrying direction of the article W is in the horizontal direction, plate springs 550 provided on the forward and rear sides in the carrying direction in order to support the carry section 510, and a vibration applying mechanism 520 that causes reciprocating linear motion of the carry section 510 in a direction tilted by a predetermined angle θ with respect to the horizontal direction. Due to this reciprocating linear motion of the carry section 510 between a point A and a point B located obliquely above and forward of point A, an article W that has been placed on the carry face 512a is carried forward in the horizontal carrying direction a little bit at a time.

Here, the reciprocating linear motion direction of the carry section 510 is tilted from the horizontal direction by a predetermined angle θ in order to create vibration components in two directions—these being a carrying-direction component in the inertia term and a normal-direction component in the friction force term—from the unidirectional reciprocating linear motion linking point A and point B. Carrying by relative sliding is thus achieved by appropriately setting a velocity pattern for this unidirectional reciprocating linear motion and appropriately accelerating the carry section 510 in the carrying direction and the normal direction (for example, see JP 2003-40424A (pages 3 to 5, FIGS. 1 to 6)).

However, the motion path of the carry section 510 of the first conventional example is a unidirectional reciprocating linear motion, and thus changing the velocity pattern of the carry section 510 also changes the degree of acceleration in both the carrying direction and the normal direction. Consequently, when setting the velocity pattern, it is possible to give only one of these two directions priority and the other direction has to be ignored. That is, the first conventional example has a poor degree of freedom with regard to setting the motion path of the carry section 510, and it is difficult to achieve a setting at which both the inertia and friction become ideal.

One example of a linear feeder that solves this problem is a feeder 601 according to a second conventional example, which is shown in the lateral view of FIG. 17, with which it is possible to independently set the reciprocating movement in a substantially horizontal direction acting as the carry direction, and the reciprocating movement in the vertical direction acting as the normal direction. The feeder 601 is provided with a carry section 610, a base section 680 that supports the carry section 610 via a plate spring structure 650, and a vibration applying mechanism 620 that is provided in the base section 680 and that applies vibration to the carry section 610.

The plate spring structure 650 is provided with a plate spring 652 that is arranged substantially horizontally and that supports the carry section 610 in such a manner that it can be moved back and forth in the vertical direction, and a plate spring 654 that is disposed vertically and that supports the carry section 610 via the plate spring 652 in such a manner that it can be moved back and forth in the substantially horizontal direction. The vibration applying mechanism 620 is provided with two electromagnets 630 and 660 for adding vibration in the substantially horizontal direction and the vertical direction, and the carry section 610 is provided with two stays 632 and 662 to correspond to these electromagnets 630 and 660. By applying an alternating power to the electromagnets 630 and 660, the carry section 610 is suitably moved back and forth in the vertical direction and the substantially horizontal direction, thereby carrying the article W placed on its carry face 612*a* forward in the carrying direction (for example, see JP 11-278634A (pages 2 and 3, FIGS. 6 to 8)).

In general, the sinusoidal waveform is the voltage waveform of an alternating power that can be readily used.

However, using a sinusoidal waveform, it is not possible to generate a complex motion path such as one that is asymmetrical with regard to the first half and second half of a single cycle of reciprocating movement. For example, from the standpoint of relative sliding as regards the reciprocating movement in the substantially horizontal direction, it is sufficient in the forward pass to move the carry section at as uniform a velocity as possible and in the return pass to move it in an accelerating manner, but the shape of a sinusoidal waveform is point symmetric with regard to the first half and the second half of a single cycle, and therefore cannot be used to generate such reciprocating movement. Further, creating a voltage waveform having a special shape other than a sinusoidal waveform requires special devices and cannot be performed with ease.

In other words, the feeder 601 of the second conventional example is superior to that of the first conventional example in that the motion path of the carry section 610 can be set independently for both the carrying direction and the normal direction, but the problem of a voltage waveform having a special shape being difficult to obtain cannot be avoided, and thus one cannot say that the feeder 601 has an excellent degree of freedom with regard to setting the motion path of the carry section 610.

Also, using electromagnets 630 and 660 gives rise to the possibility of magnetizing the article W if the article W is magnetic, and this means that there are types of articles W that cannot be carried by the article carrying apparatus 601.

Further, because the carry section 610 is supported by elastic members, such as the plate springs 652 and 654, that have low rigidity, the motion path of the carry face 612*a* is significantly affected by the elastic deformation of the plate springs 652 and 654. Consequently, there is a possibility that even though the intended motion path may be achieved at portions of the carry face 612*a* proximate to the stays 632 and 662 to which the motion is input, the motion path may stray from the design with increasing distance in the carrying direction from the stays 632 and 662. This may result in so-called carry nonuniformities, that is, the problem of carrying the article faster or slower depending on the position in the carrying direction, and in extreme cases, there is the possibility that, depending on the position in the carrying direction, the article W may be carried in backwards.

SUMMARY OF THE INVENTION

The present invention has been arrived at in light of these issues of the conventional art, and an object thereof is to provide an article carrying apparatus that has an excellent degree of freedom with regard to setting the motion path of the carry face. Another object of the present invention is to provide an article carrying apparatus with which it is possible to increase the types of articles that can be carried, and a further object thereof is to provide an article carrying apparatus that can effectively inhibit article-carry nonuniformities that occur during carrying.

An aspect of the present invention is an article carrying apparatus for carrying, in a carrying direction, an article placed on a carry face of a carry section making use of a vibration, comprising: the carry section provided with the carry face of which the carrying direction is linearly restricted; and a vibration applying mechanism that applies the vibration to the carry section, the vibration applying mechanism including: a first cam mechanism for converting a motion that has been input from a predetermined drive source into a reciprocating linear motion in a first direction that has at least a component in the carrying direction, and for transmitting the reciprocating linear motion to the carry section; and a second cam mechanism for converting a motion that has been input from a predetermined drive source into a reciprocating linear motion in a second direction that has at least a component in a normal direction of the carry face, and for transmitting the reciprocating linear motion to the carry section.

Other features of the present invention will become clear through the accompanying drawings and the following description.

BRIEF DESCRIPTION OF THE DRAWINGS

FIG. 14 is a vertical sectional view taken in the arrow direction along the line IVX—IVX in FIG. 13;

FIGS. 15A to 15C are diagrams for describing the carrying principle of the vibration-type feeder;

FIG. 16 are conceptual diagrams of an article carrying apparatus according to a first conventional example, where

DETAILED DESCRIPTION OF THE INVENTION

Figure 1:
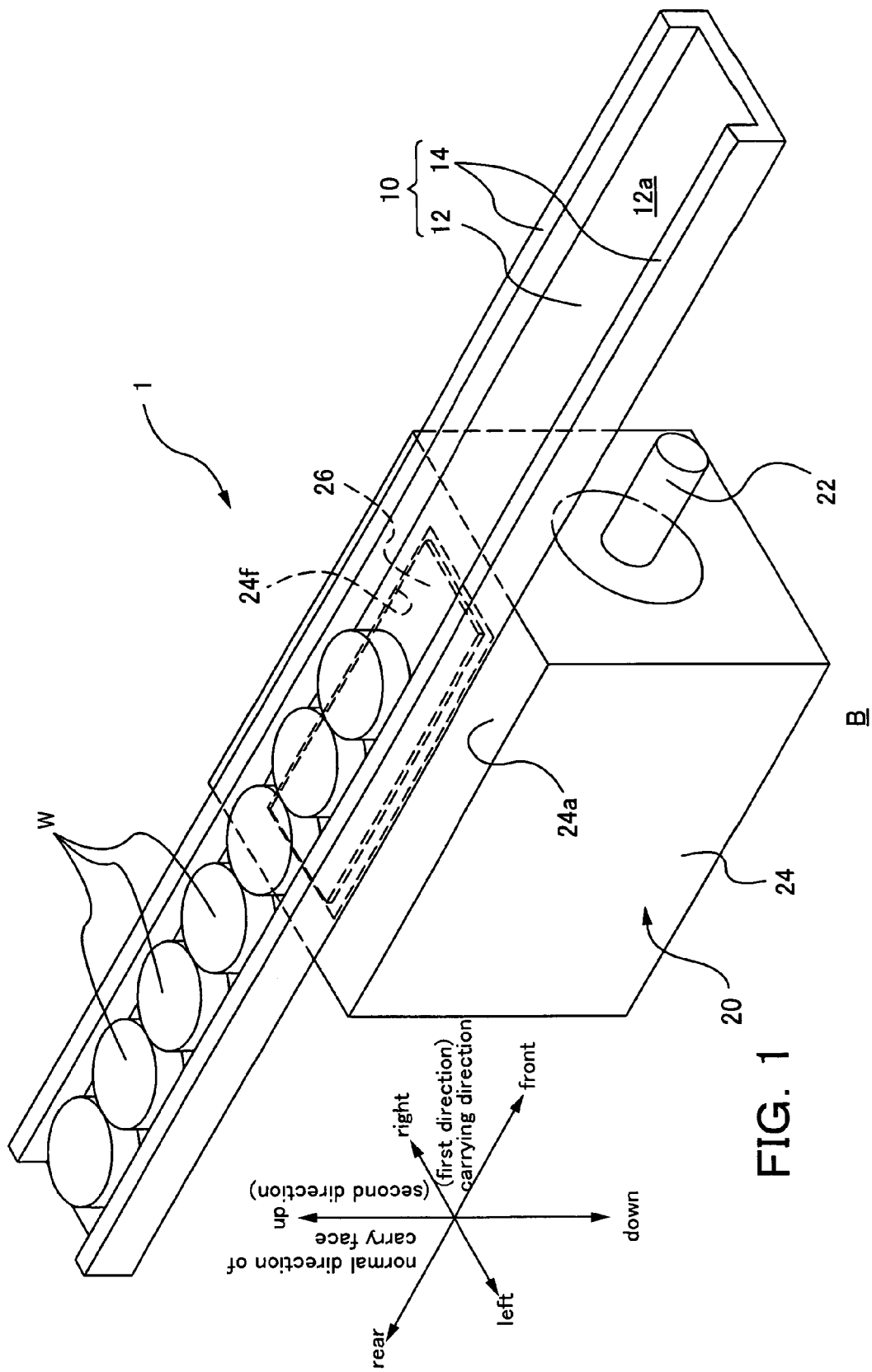
FIG. 1 is a perspective view of an article carrying apparatus for generally describing the present invention.

An aspect of the present invention is an article carrying apparatus for carrying, in a carrying direction, an article placed on a carry face of a carry section making use of a vibration, comprising: the carry section provided with the carry face of which the carrying direction is linearly restricted; and a vibration applying mechanism that applies the vibration to the carry section, the vibration applying mechanism including: a first cam mechanism for converting a motion that has been input from a predetermined drive source into a reciprocating linear motion in a first direction that has at least a component in the carrying direction, and for transmitting the reciprocating linear motion to the carry section; and a second cam mechanism for converting a motion that has been input from a predetermined drive source into a reciprocating linear motion in a second direction that has at least a component in a normal direction of the carry face, and for transmitting the reciprocating linear motion to the carry section.

With this article carrying apparatus, the carry face of the carry section vibrates over the motion path resulting from combining the reciprocating linear motion in the first direction and the reciprocating linear motion in the second direction. The reciprocating linear motion in the first direction has the component in the carrying direction and the reciprocating linear motion in the second direction has the component in the normal direction of the carry face. Consequently, the vibration of the carry face has components in both directions necessary for effectively controlling relative sliding of the article. That is, it has both a carrying-direction component in the inertia term and a normal-direction component in the friction term. Thus, this vibration allows the article on the carry face to be effectively carried in the carrying direction.

It should be noted that the reciprocating linear motion in the first direction and the reciprocating linear motion in the second direction can be set to desired reciprocating linear motions through the cam design of the first cam mechanism and the cam design of the second cam mechanism, respectively. That is, a given motion path within a two-dimensional plane defined by the first direction and the second direction can be achieved through the cam designs, thereby allowing the article carrying apparatus to have an excellent degree of freedom with regard to setting the motion path. Consequently, not only vibration having a simple motion path, but also vibration having a complex motion path can be applied to the carry section, and as a result, it is possible to apply to the carry face the most ideal vibration for the required parameters, such as the type of the article to be carried or the carrying capacity.

Further, the reciprocating linear motions are created by the cam mechanisms, and electromagnets are not used at all. This obviates the problem of the article being magnetized by an electromagnet, thereby allowing the carrying of articles made of magnetic materials as well and thus increasing the types of articles that can be carried.

Further still, since the reciprocating linear motion in the second direction contains a component in the normal direction of the carry face, at least the second cam mechanism supports the carry section against gravity. In general, cam mechanisms have high rigidity. Consequently, it is possible to go without adopting an unstable support structure such as supporting the carry section using a low-rigidity elastic member such as a plate spring, and this allows for the second cam mechanism to generate a uniform vibration in the second direction over the entire surface of the carry face. As a result, so-called carry nonuniformities, that is, the problem of carrying an article faster or slower depending on the position in the carrying direction, can be effectively inhibited.

Further, the vibration applying mechanism may include: an output section for transmitting the reciprocating linear motions to the carry section while supporting the carry section; a housing that guides the output section such that the output section moves within a plane defined by the first direction and the second direction; and a single input shaft that is rotatably supported on the housing for inputting the motion from the drive source as a rotational motion.

With such an article carrying apparatus, the carry section is guided by the housing via the output section such that it moves within the plane. Consequently, the vibration of the carry face can be stabilized, and this allows carry nonuniformities to be more effectively inhibited.

Further, because a single input shaft is provided, the first cam mechanism and the second cam mechanism both receive the same rotational motion from the same input shaft, and the two cam mechanisms each creates a reciprocating linear motion based on this rotational motion. It is thus easy to synchronize the two reciprocating linear motions created by the two cam mechanisms, therefore allowing the motion path of the carry section to easily be set to a desired motion path.

Further, the first cam mechanism may have a first cam formed integrally with the input shaft, and a first cam-following element that is provided on the output section and engages with the first cam to allow relative movement in the second direction with respect to the first cam but restrict relative movement in the first direction; and the second cam mechanism may have a second cam formed integrally with the input shaft, and a second cam-following element that is provided on the output section and engages with the second cam to allow relative movement in the first direction with respect to the second cam but restrict relative movement in the second direction.

With such an article carrying apparatus, when the output section is moved in the second direction by the second cam, for example, the first cam-following element provided on the output section also moves in the second direction in conjunction with this movement. However, the engagement between the first cam-following element and the first cam prevents relative movement between the two in the first direction but allows relative movement therebetween in the second direction. This engagement thus does not impede whatsoever the reciprocating linear motion in the second direction of the output section, thereby allowing the carry section supported on the output section to quickly perform reciprocating linear motion in the second direction based on the second cam, for example.

Conversely, when the output section is moved in the first direction by the first cam, for example, the second cam-following element provided on the output section also moves in the first direction in conjunction with this movement. However, the engagement between the second cam-following element and the second cam prevents relative movement between the two in the second direction but allows relative movement therebetween in the first direction. This engagement thus does not impede whatsoever the reciprocating linear motion in the first direction of the output section, thereby allowing the carry section supported on the output section to quickly perform reciprocating linear motion in the first direction based on the first cam, for example.

Summarizing the above, the first cam mechanism and the second cam mechanism do not interfere with one another in the transmission of reciprocating linear motion to the carry section, and thus the carry section can be moved over the intended motion path based on the cam designs of the cam mechanisms.

Further, the reciprocating linear motion in the first direction may have only the component in the carrying direction; and the reciprocating linear motion in the second direction may have only the component in the normal direction.

With such an article carrying apparatus, the cam design of the first cam mechanism allows the reciprocating linear motion in the carrying direction to be set independently, and the cam design of the second cam mechanism allows the reciprocating linear motion in the normal direction to be set independently. The carrying direction and the normal direction are perpendicular to one another.

Consequently, the reciprocating linear motions can be set independently without being affected whatsoever by the reciprocating linear motion of the other cam mechanism, and thus a motion path of the carry section that synthesizes these two reciprocating linear motions can be set with ease.

Further, the input shaft may be arranged with its axial direction in the carrying direction; the first cam may be a rib cam in which a position of formation, with respect to the axial direction, of a rib formed on an outer circumference of the input shaft changes along a circumferential direction; and the first cam-following element may be constituted by at least two cam followers that sandwich both lateral faces of the rib and that roll along the lateral faces.

With such an article carrying apparatus, the rib cams rotate along with the rotation of the input shaft about its axis, and at this time the cam followers that roll along the lateral surface of that rib are moved in the axial direction in correspondence with the formation position of the rib. Here, the axial direction is in the carrying direction, so that the cam followers are moved in the carrying direction and thus the output section also is moved in the carrying direction. The rotational motion of the input shaft can therefore cause the carry section supported on the output section to vibrate in the carrying direction.

Further, the two cam followers are disposed such that they sandwich the lateral surfaces of the rib. Thus, a change in the formation position of the rib can be reliably transmitted to the carry section during forward and rearward movement in the carrying direction. That is, the intended vibration as expressed by the formation position of the rib can be reliably applied to the carry section without being affected whatsoever by backlash.

Further, the second cam may be a face cam formed on the outer circumference of the input shaft; and the second cam-following element may be a cam follower that fits into an annular groove formed in an end face of the face cam and rolls along an inner face of the annular groove.

With such an article carrying apparatus, when the input shaft rotates about its axis, the face cam also is similarly rotated, and at this time the cam followers that roll along the annular grooves of the face cam are moved in the radial direction of the input shaft in accordance with the formation position of the annular groove. Here, the axial direction of the input shaft is in the carrying direction, that is, the radial direction is in the normal direction of the carry face, and thus the carry section is moved in the normal direction in accordance with the movement of the cam followers. Consequently, the carry section can be vibrated in the normal direction of the carry face by the rotational motion of the input shaft.

Further, because the cam followers are rolled while being fitted into the annular groove, the change in the formation position of the annular groove can be correctly transmitted to the carry section both when it is being moved forward and rearward in the normal direction. That is, the intended vibration as expressed by the formation position of the annular groove can be applied to the carry section without being greatly affected by backlash.

Further, the second cam may be a plate cam formed on the outer circumference of the input shaft; and the second cam-following element may be a cam follower that rolls along an outer circumferential face of the plate cam which serves as a roll face.

With such an article carrying apparatus, when the input shaft rotates about its axis, the plate cam is similarly rotated. At this time, the cam follower that rolls along the outer circumferential surface of the plate cam is moved in the radial direction of the input shaft in accordance with the radius of the plate cam. Here, the axial direction of the input shaft is in the carrying direction, so its radial direction is in the normal direction of the carry face, and thus the carry section is moved in the normal direction due to the movement of the cam follower. Consequently, the carry section can be vibrated in the normal direction of the carry face by the rotational motion of the input shaft.

Further, an elastic member for pressing the output section toward the plate cam such that an outer circumferential face of the cam follower comes into contact with the outer circumferential face of the plate cam may be interposed between the housing and the output section.

With such an article carrying apparatus, the elastic member pushes the cam follower such that its outer circumferential surface comes into contact with the outer circumferential surface of the plate cam. Thus, the change in radius of the plate cam can be correctly transmitted to the output section during movement forward and rearward in the normal direction. As a result, the intended vibration as expressed by the radius of the plate cam can be applied to the carry section without being significantly affected by backlash.

Further, the second cam may be a constant diameter cam that is formed on the outer circumference of the input shaft and whose diameter is constant over its circumferential direction; the second cam-following element may be a frame section disposed with its inner circumferential face facing an outer circumferential face of the constant diameter cam; and the constant diameter cam may be sandwiched by the inner circumferential face of the frame section at both end portions in the second direction of its outer circumferential face, and may rotate along with the rotation of the input shaft about an axis of the input shaft.

With such an article carrying apparatus, when the input shaft rotates about its axis, the constant diameter cam is similarly rotated. At this time, the frame section abutting against both end portions of the constant diameter cam is moved in the radial direction of the input shaft in accordance with the radius of the constant diameter cam. Here, the axial direction of the input shaft is in the carrying direction, so its radial direction is in the normal direction of the carry face, and thus the carry section also is moved in the normal direction due to the movement of the frame section. Consequently, the carry section can be vibrated in the normal direction of the carry face by the rotational motion of the input shaft.

Further, the constant diameter cam is rotated about the input-shaft axis along with the rotation of the input shaft while the end portions in the second direction of its outer circumferential surface are sandwiched by the inner circumferential surface of the frame section. Consequently, the change in radius of the constant diameter cam can be correctly transmitted to the carry section during movement of the carry section forward and rearward in the normal direction. That is, the intended vibration as expressed by the radius of the constant diameter cam can be applied to the carry section without being significantly affected by backlash.

Further, the second cam may be provided in at least two locations in the axial direction of the input shaft.

With such an article carrying apparatus, the carry section is supported in at least two points by the second cam. Thus, the support stability of the carry section is excellent, and moreover a uniform vibration in the normal direction of the carry face can be generated over the entire surface of the carry face.

Further, the housing may have a guide face for guiding the output section such that the output section moves within the plane; and a viscous fluid may be held in a gap between the guide face and a portion of the output section that is in opposition to the guide face.

With such an article carrying apparatus, the viscous fluid that is held in the gap effectively functions as an oil film damper. That is, deleterious vibration of the carry section itself that can occur for structural reasons resulting from bending deformation of the carry section or the output section supporting the carry section can be damped by the viscosity resistance of the viscous fluid. Consequently, such deleterious vibration is effectively inhibited, thus allowing the intended vibration defined by the cam mechanisms to be given to the carry section.

Further, the gap may be set from 0.005 mm to 0.05 mm.

With such an article carrying apparatus, the gap is set to at least 0.005 mm, and thus physical contact between the guide face and the above-mentioned portion of the output section can be reliably prevented, and the viscous fluid within the gap can be reliably caused to function as an oil film damper.

Further, because the gap is set to not more than 0.05 mm, shaking of the output section can be kept small.

Further, multiple grooves may be formed in at least one of the guide face and the portion of the output section that is in opposition to the guide face.

With such an article carrying apparatus, the multiple grooves can hold the viscous fluid in the gap favorably, and this allows an oil film damper to be reliably formed in the gap.

Further, the reciprocating linear motion in the first direction may have only the component in the carrying direction, and the carrying direction may be in a horizontal direction; and the reciprocating linear motion in the second direction may have only the component in the normal direction, and the normal direction may be in a vertical direction.

With such an article carrying apparatus, the carrying direction is in the horizontal direction, and thus an extremely versatile article carrying apparatus can be adopted. Further, because the normal direction is in the vertical direction, the friction between the article and the carry face, which affects carrying ability, can be set with ease.

Further, when the carry section is moved, due to the reciprocating linear motion in the carrying direction, from a first position to a second position forward of the first position in the carrying direction, and moved from the second position to the first position, a time required to move from the first position to the second position may be longer than a time required to move from the second position to the first position.

With such an article carrying apparatus, the carry section repeatedly performs reciprocating movement between the first position and the second position in the carrying direction, thereby carrying the article placed on the carry face forward in the carrying direction in small increments. That is, the carry section, when moving from the first position to the second position, is moved to the second position while relative sliding of the article with respect to the carry face is suppressed, thereby moving the article to the second position, and when returning from the second position to the first position, the carry section is returned to the first position while relative sliding is allowed to occur, thereby retaining the article at the second position and returning only the carry section to the first position. This movement is repeated to carry the article forward in the carrying direction.

Here, the carry section, when moving from the first position to the second position, moves forward slowly in the carrying direction, allowing the rearward inertia acting on the article to be reduced. Relative sliding of the article with respect to the carry face can therefore be suppressed when moving from the first position to the second position, and thus the article can be carried to the second position.

On the other hand, when returning to the first position from the second position, the carry section is moved rearward quickly, therefore allowing a large forward inertia to act on the article. Relative sliding of the article with respect to the carry face can therefore be generated when moving from the second position to the first position, and thus the article can be retained at the second position while returning only the carry section to the first position.

Further, during movement of the carry section from the first position to the second position, the carry section may move at a constant velocity in the carrying direction for a predetermined duration.

With such an article carrying apparatus, the time that the carry section moves at constant velocity is set during movement from the first position to the second position. During the time that the carry section is moving at constant velocity, the inertia acting on the article is small, thereby inhibiting relative sliding of the article with respect to the carry face.

Consequently, relative sliding when moving from the first position to the second position can be effectively inhibited, and as a result, the movement of the carry section to the second position allows the article to be effectively carried to the second position.

Further, when an upward velocity of the carry section is increasing due to the reciprocating linear motion in the vertical direction, the carry section may move at a constant velocity during movement of the carry section from the first position to the second position.

With such an article carrying apparatus, when the upward velocity of the carrying section is increasing, the carry section moves at constant velocity during movement from the first position to the second position. The friction that occurs between the article and the carry face becomes large while the velocity is increasing and the inertia acting on the article becomes small during constant velocity movement, and the combined effect is that relative sliding of the article with respect to the carry face is significantly inhibited.

Consequently, the article can be reliably carried to the second position when the carry section moves from the first position to the second position.

Further, during movement of the carry section from the second position to the first position, a downward velocity of the carry section may be increased.

With such an article carrying apparatus, the downward velocity of the carry section is increased during movement of the carry section from the second position to the first position. The friction that occurs between the article and the carry face becomes small while the velocity is increasing, and this significantly stimulates the relative sliding of the article with respect to the carry face.

Consequently, the article can be reliably kept at the second position while returning only the carry section to the first position when moving the carry section from the second position to the first position.

Further, the first cam mechanism may have a first cam formed integrally with the input shaft, and a first cam-following element that is provided on the output section; and the first cam may have a cam face that, during reciprocating movement of the output section in the second direction, maintains contact with the first cam-following element of the output section and in which the point of contact moves in the same direction as the second direction.

With such an article carrying apparatus, the contact position between the cam face of the first cam and the first cam-following element of the output section does not change in the first direction when the output section moves back and forth in the second direction. Thus, unintended movement action in the first direction is not applied to the output section, thereby allowing it to efficiently and properly carry the article.

Further, the second cam mechanism may have a second cam formed integrally with the input shaft, and a second cam-following element that is provided on the output section; and the second cam may have a cam face that, during reciprocating movement of the output section in the first direction, maintains contact with the second cam-following element of the output section and in which the point of contact moves in the same direction as the first direction.

With such an article carrying apparatus, the contact position between the cam face of the second cam and the second cam-following element of the output section does not change in the second direction when the output section moves back and forth in the first direction. Thus, unintended movement action in the second direction is not applied to the output section, thereby allowing it to efficiently and properly carry the article.

Overview of the Article Carrying Apparatus According to the Present Invention

First, an overview of the present invention is described with reference to FIG. 1 and FIG. 2.

Figure 2:
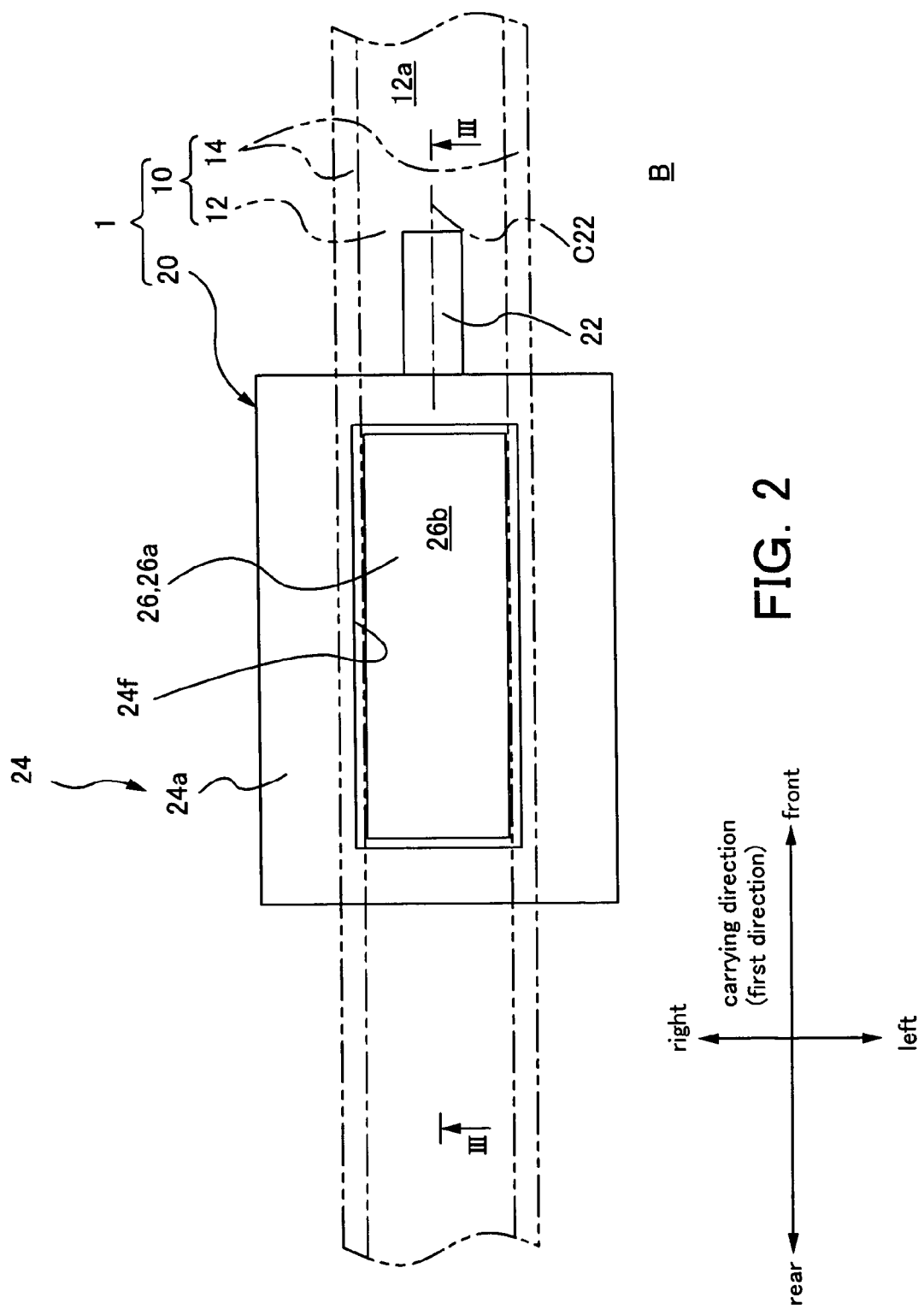
FIG. 2 is a top view of the apparatus shown in FIG. 1.

FIG. 1 is a perspective view of the article carrying apparatus for generally describing the present invention, and FIG. 2 is a plan view thereof.

As shown in these drawings, an article carrying apparatus 1 according to the present invention is a so-called linear feeder, and is provided with a carry section 10 furnished with a carry face 12a whose carrying direction is linearly restricted, and a vibration applying mechanism 20 that applies vibration to the carry section 10.

The vibration applying mechanism 20 is internally provided with two cam mechanisms 30 and 60. The vibration is obtained by synthesizing the reciprocating linear motions created by the two cam mechanisms 30 and 60. That is, the first cam mechanism 30 converts the motion received from a predetermined drive source (not shown) into reciprocating linear motion in a first direction that has at least a carrying-direction component and transmits this to the carry section 10. The second cam mechanism 60 converts the motion received from a predetermined drive source (not shown) into reciprocating linear motion in a second direction that has at least a component in the normal direction of the carry face 12a and transmits this to the carry section 10. As a result, the vibration of the carry face 12a contains both a carrying-direction component in the inertia term and a normal-direction component in the friction force term, which are necessary for effectively controlling the relative sliding of the article W with respect to the carry face 12a, and due to this vibration, the article W on the carry face 12a can be effectively carried in the carrying direction.

The reciprocating linear motion of the first direction and the reciprocating linear motion of the second direction can each be independently set to a desired reciprocating linear motion through the design of the later-described cam curve of the first cam mechanism 30 and through the design of the later-described cam curve of the second cam mechanism 60, respectively. That is, a given motion path within a two-dimensional plane defined by the first direction and the second direction can be achieved through the design of the cam curves, and therefore, the article carrying apparatus 1 has an excellent degree of freedom with regard to setting of the motion path. Thus, it is possible to apply not only a vibration having a single motion path, but also a vibration having a complex motion path, to the carry section 10, and as a result it is possible to apply, to the carry face 12a, a vibration that is most suited to the required parameters, such as the type of the article W to be carried and the carrying capacity.

It should be noted that the following description is made on the assumption that, as shown in FIG. 1, the first direction matches the carrying direction and that the second direction matches the normal direction of the carry face 12a, but in no way is this a limitation, and for example, it is also possible for the reciprocating linear motion of the first direction to include direction components other than of the carrying direction, and similarly, it is also possible for the reciprocating linear motion of the second direction to include direction components other than of the normal direction.

However, it is preferable to adopt the above assumption. This is because if the reciprocating linear motions of the first direction and the second direction respectively include only a carrying-direction component and only a normal-direction component, then when setting the first direction and second direction reciprocating linear motions, this can be done independently without being affected whatsoever by the other reciprocating linear motion. As a result, the vibration of the carry section 10, which is obtained by synthesizing these two reciprocating linear motions, can be easily set to a desired motion path.

Also, the following description is made on the assumption that the carrying direction is in the horizontal direction and the normal direction of the carry face 12a is in the vertical direction, but in no way is this a limitation. For example, it is also possible for the carrying direction to be tilted vertically with respect to the horizontal direction by a predetermined angle so as to carry the article W in an obliquely upward direction or an obliquely downward direction.

Further, in the embodiments described below, as shown in FIG. 1, a configuration in which a drive source (not shown) is used in common for the two cam mechanisms 30 and 60 (not shown), that is, a configuration in which the motion from a single drive source is input to the cam mechanisms 30 and 60 via a single input shaft 22, is used as an example, but in no way is this a limitation, and for example, it is also possible to provide a dedicated drive source for each of the two cam mechanisms 30 and 60.

However, the above configuration in which a single drive source is used in common is preferable. This is because a same input motion allows the reciprocating linear motion caused by the first cam mechanism 30 and the reciprocating linear motion caused by the second cam mechanism 60 to be synchronized with ease.

First Embodiment

Figure 3:
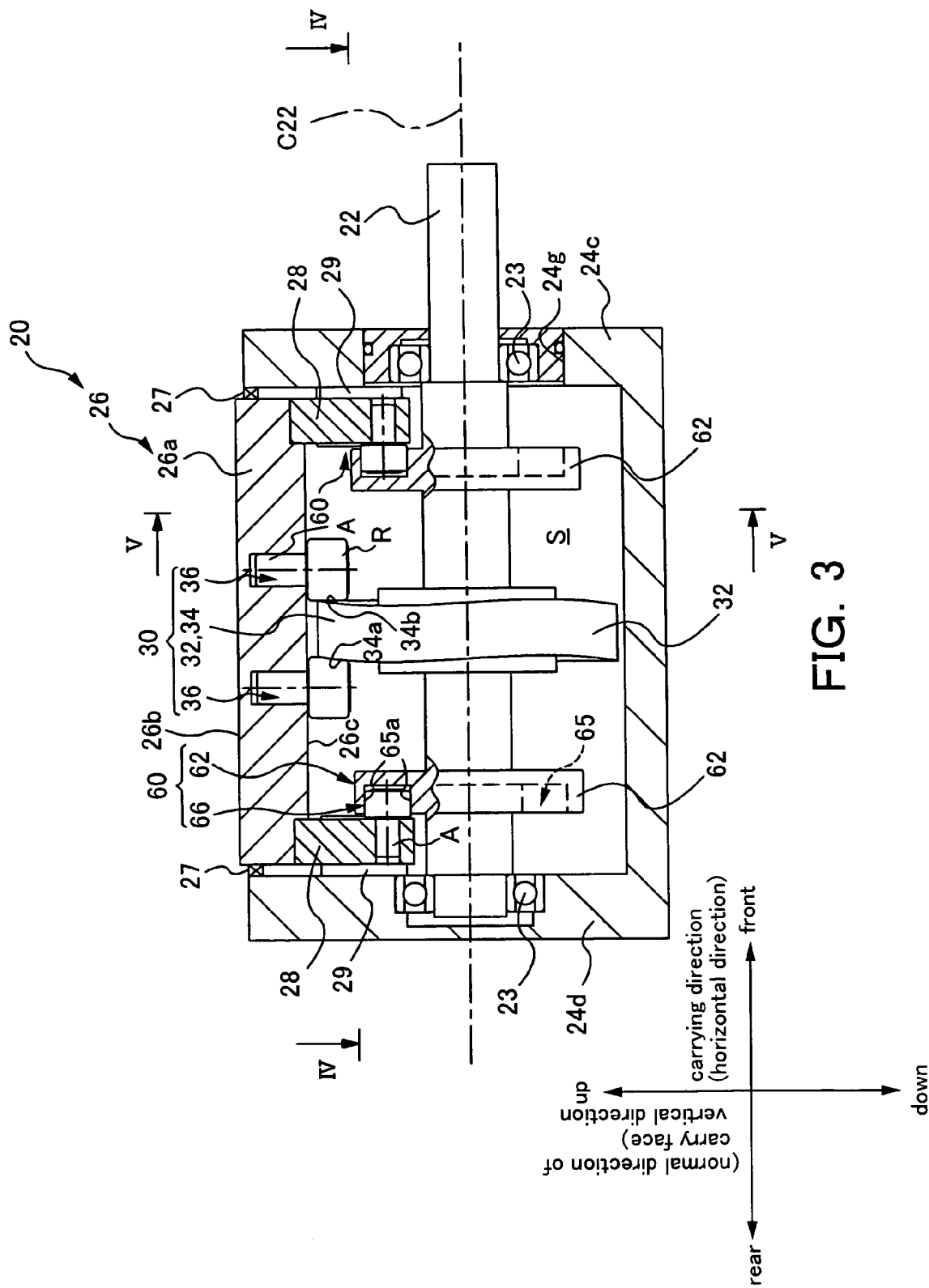
FIG. 3 is an explanatory diagram of the first embodiment, and is a vertical sectional view taken in the arrow direction along the line III—III in FIG. 2.
Figure 4:
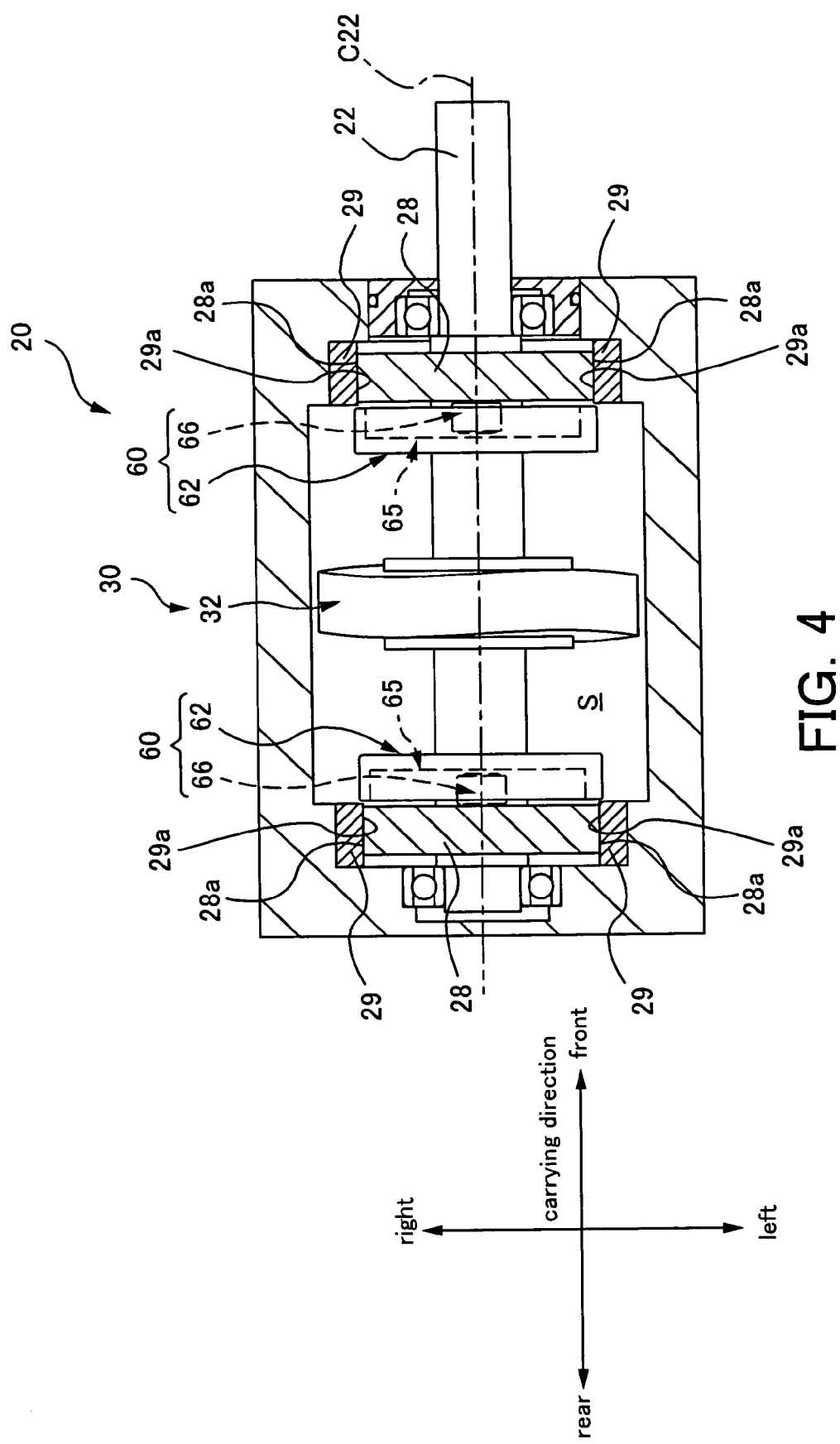
FIG. 4 is a transverse sectional view taken in the arrow direction along the line IV—IV in FIG. 3.
Figure 5B:
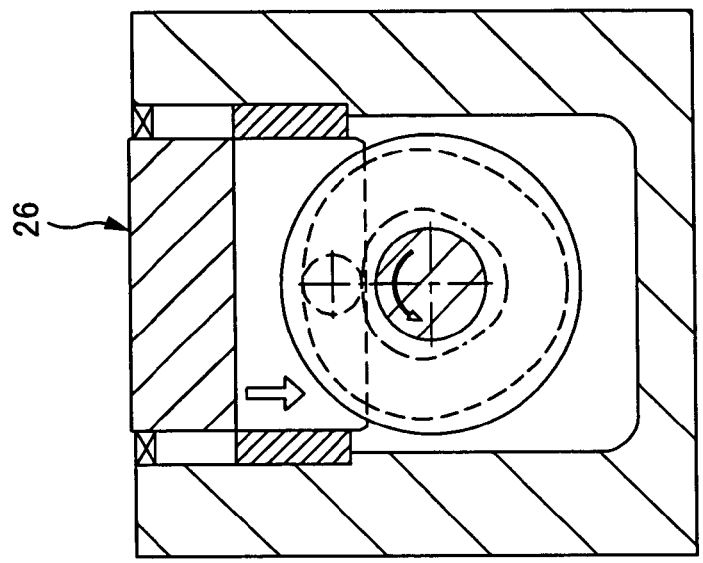
FIG. 5 is a vertical sectional view taken in the arrow direction along the line V—V in FIG. 3.

FIGS. 3 through 5B are explanatory diagrams of an article carrying apparatus of the first embodiment. FIG. 3 is a vertical sectional view taken in the arrow direction along the line III—III in FIG. 2. FIG. 4 is a transverse sectional view taken in the arrow direction along the line IV—IV in FIG. 3. FIGS. 5A and 5B are both vertical sectional views taken in the arrow direction along the line V—V in FIG. 3, and these diagrams respectively show a state in which a later-described output section is in the top dead center and the bottom dead center in the vertical direction. It should be noted that in FIG. 3 and FIG. 4, some portions are viewed from the side and from the above, respectively. Further, in all drawings, hatching has been added along the cutting plane.

For the sake of convenience, in the following description, the carrying direction may also be expressed using "front/rear" and the vertical direction may also be expressed by "up/down," as shown in FIG. 1. Further, the direction that is perpendicular to the carrying direction and the vertical direction is expressed as "left/right."

(1) Carry Section

As shown in FIG. 1 and FIG. 2, the carry section 10 has an elongate belt-shaped flat plate member 12 that has a horizontal, flat upper face 12a. The upper face 12a of the member 12 function as the carry face, and thus the carrying direction is in the horizontal direction and the normal direction of the carry face 12a is in the vertical direction.

A projecting section 14 is formed continuously on both sides on the left and right of the upper face 12a of the member 12 over the entire length of the member 12 in the lengthwise direction, and this pair of projecting sections 14 linearly restricts the carrying direction in the lengthwise direction.

(2) Vibration Applying Mechanism

As shown in FIG. 1 and FIG. 2, the vibration applying mechanism 20, which supports the carry section 10 while vibrating the carry section 10 in accordance with a predetermined motion path, is disposed below the carry section 10 and is fastened to a portion B of a fastening system, such as the foundation of the factory. It should be noted that the motion path is a path within a two-dimensional plane defined by the carrying direction and the vertical direction and is obtained by synthesizing the reciprocating linear motions in these two directions.

The vibration applying mechanism 20 is provided with a substantially oblong box-shaped housing 24 having a substantially rectangular opening 24f in its upper face wall 24a, an output section 26 that is disposed at a position where it blocks the opening 24f and that is for supporting the carry section 10, a first cam mechanism 30 and a second cam mechanism 60 disposed within the housing 24 for applying the motion of the motion path to the output section 26, and a single input shaft 22 for inputting the rotational motion from the drive source to the cam mechanisms 30 and 60.

(2-A) Input Shaft

As shown in FIG. 3, the input shaft 22 is a substantially round bar member arranged with its axis C22 direction in the carrying direction. At its ends the input shaft 22 is supported on a front face wall 24c and a rear face wall 24d of the housing 24 via bearings 23, thereby allowing the input shaft 22 to freely rotate about its axis with respect to the housing 24.

It should be noted that one end portion of the input shaft 22 is accommodated within the housing 24 whereas its other end portion protrudes to the outside through a through hole 24g formed in the front face wall 24c of the housing 24. This other end portion is connected to a drive source (not shown) such as a motor via a suitable coupling (not shown), and the rotational motion about its axis is input from the drive source to the input shaft 22.

It should be pointed out that first and second cams 32 and 62 of the first and second cam mechanisms 30 and 60 are formed in the outer circumference of the input shaft 22, although these are discussed later.

(2-B) Output Section

As shown in FIG. 2, the output section 26 is disposed inside the opening 24f of the upper face wall 24a, and has as a main member 26a which is a flat plate member that is slightly smaller than the opening 24f.

An attachment face for fixedly attaching the lower face of the carry section 10 is formed in an upper face 26b of the output section main member 26a, and the carry section 10, when fastened to this attachment face, functions as a single member with the output section 26 and moves over the same motion path as the output section 26.

As shown in FIG. 3, oblong lift members 28 are provided on a lower face 26c of the output section main member 26a. The lift member 28 has two functions. Its first function is to transmit, to the output section main member 26a, a vertical-direction reciprocating linear motion that is output from the second cam mechanism 60, which is arranged below the output section main member 26a, and this function is described in the section describing the second cam mechanism 60.

Its second function is to serve as a guide structure that restricts movement of the output section main member 26a in the left/right direction so as to guide the output section main member 26a such that it can move only in the carrying direction and the vertical direction. That is, as shown in FIG.

Figure 5A:
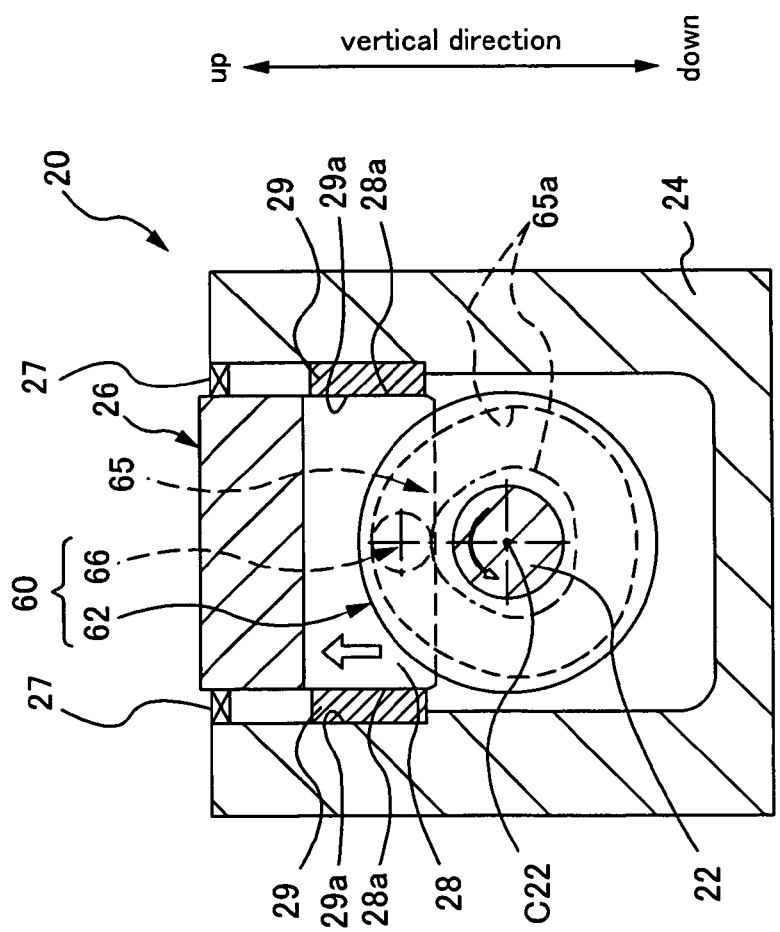

4 and FIG. 5A, end faces 28a in the left/right direction of each lift member 28 are formed as flat faces parallel to the two-dimensional plane defined by these two directions. Guide members 29 furnished with a guide face 29a parallel to the end faces 28a are fastened to the portions on the inner face of the housing 24 that are in opposition to the end faces 28a. Due to sliding between the guide faces 29a and the end faces 28a, the output section 26 is stably moved over the motion path within the two-dimensional plane.

It should be noted that preferably a predetermined gap G is provided between the guide faces 29a and the end faces 28a (see FIG. 8), and an oil as a viscous fluid is held in the gap. In this way, it is possible to give the gap G the function of a so-called oil film damper. This will be discussed later.

As shown in FIG. 3, one lift member 28 is provided at both the front and rear end portions in the carrying direction of the lower face of the output section main member 26a. In other words, the output section 26 is guided at two locations in the carrying direction, and thus the output section 26 is reliably kept from moving in the left/right direction.

Also, as shown in FIG. 3 and FIG. 5A, a seal member 27 made of an elastic material such as rubber is provided in the gap between the output section 26 and the opening 24f of the housing 24 over the entire circumference of the opening 24f. The seal member 27 is a so-called oil seal that blocks the cam lubricant oil filled into the space within the housing 24 from leaking to the outside. As for the type of the elastic member, because the output section main member 26a moves back and forth in the carrying direction, a member that has the ability to elastically deform by an amount that is equal to or greater than this reciprocating movement amount is preferable.

(2-C) First Cam Mechanism

The first cam mechanism 30 shown in FIG. 3 is for creating the carrying-direction component motion of the motion path and applies this to the output section 26. That is, it converts the rotational motion of the input shaft 22 into reciprocating linear motion in the carrying direction and transmits this to the output section 26.

The first cam mechanism 30 is structured using a so-called rib cam. That is, it is provided with a rib cam 32 as a first cam that is constituted by an annular rib 34 formed on the outer circumference of the input shaft 22, and cam followers 36 as first cam-following elements that are provided in the output section main member 26a and that are engaged with the rib 34.

The configuration of the cam followers 36 are well known; that is, each cam follower 36 is provided with a rotation shaft A and an outer ring R that covers the outer circumference of the rotation shaft A and rotates about the rotation shaft. The rotation shaft A is fastened to a member on the follower side of the cam mechanism, but its outer ring R is disposed such that, when used, it rolls along a cam face of the cam. It should be noted that the cam followers 66 of the second cam mechanism described later have the same structure.

As shown in FIG. 3, there are two cam followers 36 provided side by side to the front and rear in the carrying direction in the lower face 26c of the output section main member 26a, and the two cam followers 36 sandwich the lateral faces 34a and 34b of the rib 34 with their respective outer rings R and roll along the lateral faces 34a and 34b. It should be noted that the lateral faces 34a and 34b are the cam faces.

On the other hand, the position where the rib 34 of the rib cam 32 is formed changes in the carrying direction, which is also the axial direction of the input shaft 22, along the direction of rotation, and the cam curve of the rib cam 32 is expressed by the amount of this change.

Therefore, when the rib cam 32 rotates together with the rotational movement of the input shaft 22, the position of the rib 34 sandwiched by the two cam followers 36 changes in the carrying direction, thus moving the cam followers 36 in the carrying direction in accordance with this change. In conjunction with this the output section 26 also is moved forward and rearward in the carrying direction, and thus the carry section 10 fastened to the output section 26 performs reciprocating linear motion in the carrying direction in accordance with the cam curve of the rib cam 32.

Figure 6B:
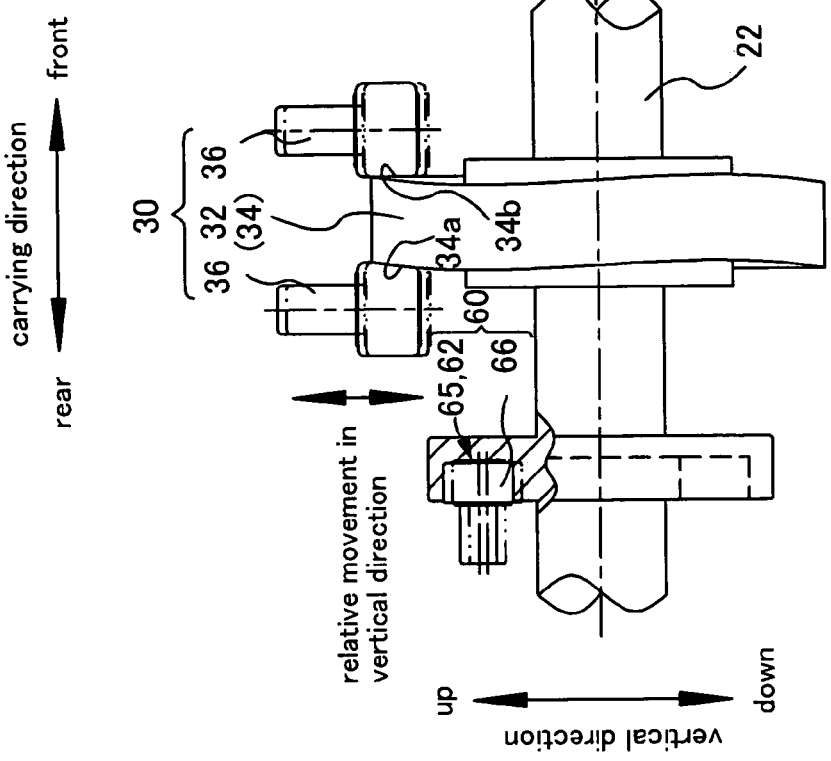
FIG. 6B is a diagram for illustrating how the second cam mechanism does not impede the reciprocating movement of the output section in the carrying direction.
Figure 6A:
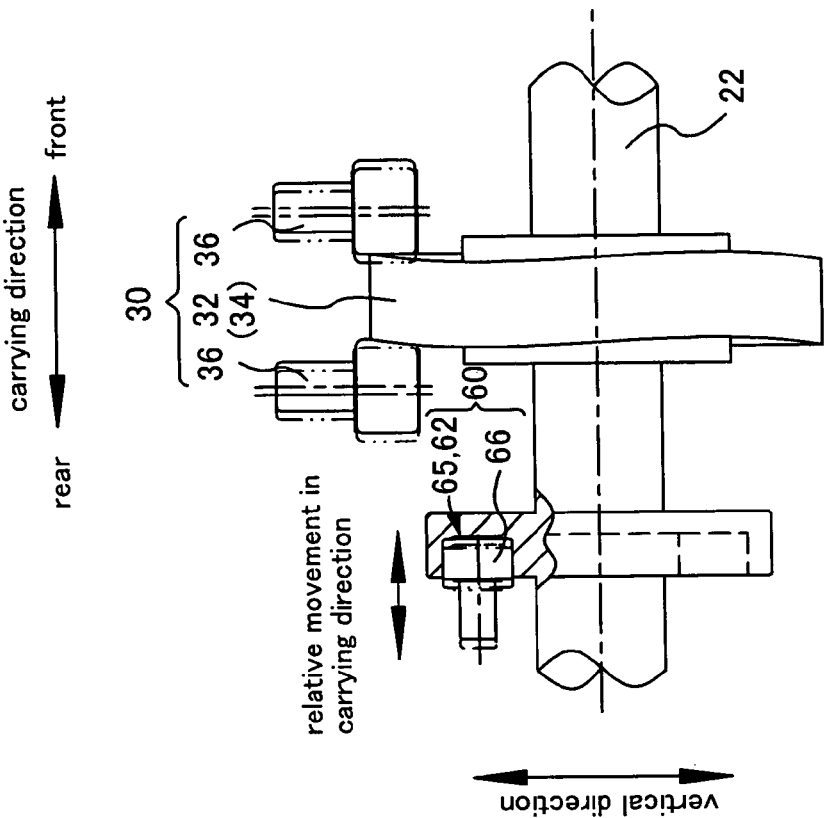
FIG. 6A is a diagram for illustrating how the first cam mechanism does not impede the reciprocating movement of the output section in the vertical direction.

It should be noted that as shown in FIG. 3, the lateral faces 34a and 34b of the rib 34, which function as the cam faces of the first cam, are formed as curved faces perpendicular to the axial direction of the horizontal input shaft 22, and the rotation shaft A of the cam follower 36 also is in the vertical direction. Thus, the rib cam 32 and the cam follower 36, which are in contact with one another, are restricted from relatively moving in the carrying direction but are allowed to relatively move in the vertical direction. In other words, as shown by the long-short dashed line in FIG. 6A, the cam followers 36 are capable of relative movement in the vertical direction while maintaining the state of sandwiching the rib 34 of the rib cam 32.

Consequently, when the output section 26 is moved back and forth in the vertical direction, which is the second direction, by the second cam mechanism 60, which is described later, the cam followers 36 fastened to the output section 26 also move in the vertical direction, and in this case as well, the cam followers 36 sandwiching the rib cam 32 can slide in the vertical direction with respect to the rib cam 32 and thus do not impede reciprocating motion of the output section 26 in the vertical direction whatsoever. For this reason, the output section 26 can quickly perform reciprocating linear motion in the vertical direction due to the second cam mechanism 60.

The cam faces 34a and 34b of the first cam can be described in different terms than the above. The cam faces 34a and 34b of the first cam are formed as curved faces perpendicular to the axial direction of the input shaft 22. As a result, it is possible to achieve a cam face with which contact with the cam follower 36 of the output section 26 is maintained while the point of contact moves in the same direction as the vertical direction, even when the output section 26 is moved back and forth in the vertical direction.

Consequently, when the output section 26 is moved back and forth in the vertical direction by the second cam mechanism 60, the cam followers 36 fastened to the output section 26 also are moved in the vertical direction, and in this case as well, the cam followers 36 maintain contact with the cam faces 34a and 34b of the first cam and move along the cam faces 34a and 34b in the vertical direction. Thus, unintended movement action in the carrying direction is not applied to the output section 26, and as a result it is possible to efficiently and accurately carry articles on the carry section 10.

The two cam followers 36 sandwich the rib 34. Therefore, as shown by the long-short dashed line in FIG. 6B, a positional shift in the rib 34 can be reliably transmitted to the output section 26, for both the forward and rearward reciprocating movements in the carrying direction. Thus, the vibration as expressed by the cam curve of the rib cam 32 can be applied to the carry section 10 via the output section 26 without being affected whatsoever by so-called "backlash."

(2-D) Second Cam Mechanism

The second cam mechanism 60 shown in FIG. 3 creates the motion that has a vertical direction component of the motion path and applies this motion to the output section 26; that is, it converts the rotational motion of the input shaft 22 into reciprocating linear motion in the vertical direction and transmits this to the output section 26.

Each second cam mechanism 60 is constituted by a so-called face cam. That is, as shown in FIG. 3 and FIG. 5A, it is provided with a disk-shaped face cam 62 as a second cam formed on the input shaft 22, and a cam follower 66 serving as a second cam-following element that is provided on the lift member 28 and that engages with an annular groove 65 formed in one of the plate faces of the face cam 62.

As shown in FIG. 3, a pair of face cams 62 are provided at the front and rear in the carrying direction in correspondence with the pair of front and rear lift members 28, and the face cams 62 are provided on the input shaft 22 between the pair of lift members 28 in the carrying direction. The plate faces of the face cams 62 are in opposition to either the forward side or the rear side end face of the respective lift member 28.

As shown in FIG. 5A, the annular groove 65 is formed about the axial direction of the input shaft 22 in the plate face of the face cam 62 that is in opposition to the lift member 28. The radial distance from the axis C22 differs depending on the position in the circumferential direction, and the cam curve of the face cam 62 is expressed through this change in radius. It should be noted that the cam faces are a pair of inner circumferential faces 65a of the annular groove 65 and abut against the outer circumferential face of the cam followers 66.

On the other hand, each cam follower 66 is disposed vertically above the axis C22, which is the rotation axis of the face cam 62, in the end face of the respective lift member 28 in opposition to the face cam 62, and the cam follower 66 fits into the annular groove 65 of the face cam 62.

Therefore, when the face cams 62 rotate together with the rotational motion of the input shaft 22, then together with this rotation, the cam followers 66 roll along the inner circumferential faces 65a of the annular grooves 65, and at this time the cam followers 66 are moved vertically in correspondence with the change in groove position in the radial direction of the annular grooves 65 into which they are fitted. Then, naturally, the lift members 28 on which the cam followers 66 are provided, as well as the output section 26, also are moved vertically, and as a result, the carry section 10 fastened to the output section 26 performs reciprocating linear motion in the vertical direction in correspondence with the cam curve of the face cam 62.

It should be noted that as shown in FIG. 3, the inner circumferential faces 65a of the annular grooves 65, which serve as the cam faces of the second cam, are formed as curved faces that are parallel to the carrying direction, and the rotation shaft A of the cam followers 66 also is in the carrying direction. Thus, the face cams 62 and the cam followers 66 are restricted from relatively moving in the vertical direction but are allowed to relatively move in the carrying direction. That is, as shown by the long-short dashed lines in FIG. 6B, the cam followers 66 are capable of relative movement in the carrying direction while remaining fitted into the annular grooves 65 of the face cams 62.

Consequently, when the output section 26 is moved back and forth in the carrying direction, which is the first direction, by the first cam mechanism 30, the cam followers 66, which are fastened to the output section 26 via the lift member 28, also move in the carrying direction, and in this case as well, the cam followers 66 fitted into the annular grooves 65 are capable of sliding in the carrying direction with respect to the annular grooves 65, and thus do not impede reciprocating movement in the carrying direction whatsoever. For this reason, the output section 26 can quickly perform reciprocating linear motion in the carrying direction based on the first cam mechanism 30.

The cam faces 65a of the second cam can be expressed using different terms than the above. The cam faces 65a of the second cam are formed as curved faces parallel to the carrying direction. As a result, it is possible to achieve a cam face that maintains contact with the cam follower 66 of the output section 26 while the point of contact moves in the same direction as the carrying direction, even when the output section 26 moves back and forth in the carrying direction.

Therefore, when the output section 26 is moved back and forth in the carrying direction by the first cam mechanism 30, the cam followers 66 fastened to the output section 26 also are moved in the carrying direction, and in this case as well, the cam followers 66 maintain contact with the cam faces 65a of the second cam and move along the cam faces 65a in the carrying direction. Thus, unintended movement action in the vertical direction is not applied to the output section 26, and as a result it is possible to efficiently and accurately carry articles on the carry section 10.

The cam followers 66 are fitted into the annular grooves 65. Therefore, as shown by the long-short dashed line in FIG. 6A, a change in the position of the annular grooves 65 can be reliably transmitted to the output section 26, for both upward and downward reciprocating movements. Thus, the vibration as expressed by the cam curve of the face cams 62 can be applied to the carry section 10 via the output section 26 without being significantly affected by so-called "backlash".

One outcome of the above-described structure is that the second cam mechanism 60 supports the entire weight of the carry section 10 via the output section 26. Cam mechanisms in general have high rigidity. Consequently, a uniform vibration in the vertical direction can be applied to the entire carry face 12a by the rigid second cam mechanism 60 without having to adopt an unstable support structure such as one in which the carry section 10 is supported by an elastic member having low rigidity, such as the plate spring mentioned above. As a result, the above-described carrying nonuniformities can be effectively inhibited. Further, the second cam mechanism 60 supports the output section 26 at two positions at the front and rear in the carrying direction, and this, too, increases the support stability and allows to achieve an even greater effect of inhibiting carrying non-uniformity.

(2-E) Oil Film Damper

The oil filter damper is a damper that utilizes the viscosity of oil, which functions as a viscous fluid. That is, it attenuates the relative movement of two objects that oppose one another via an oil film using the shearing force of the oil film as a damping force.

Figure 7:
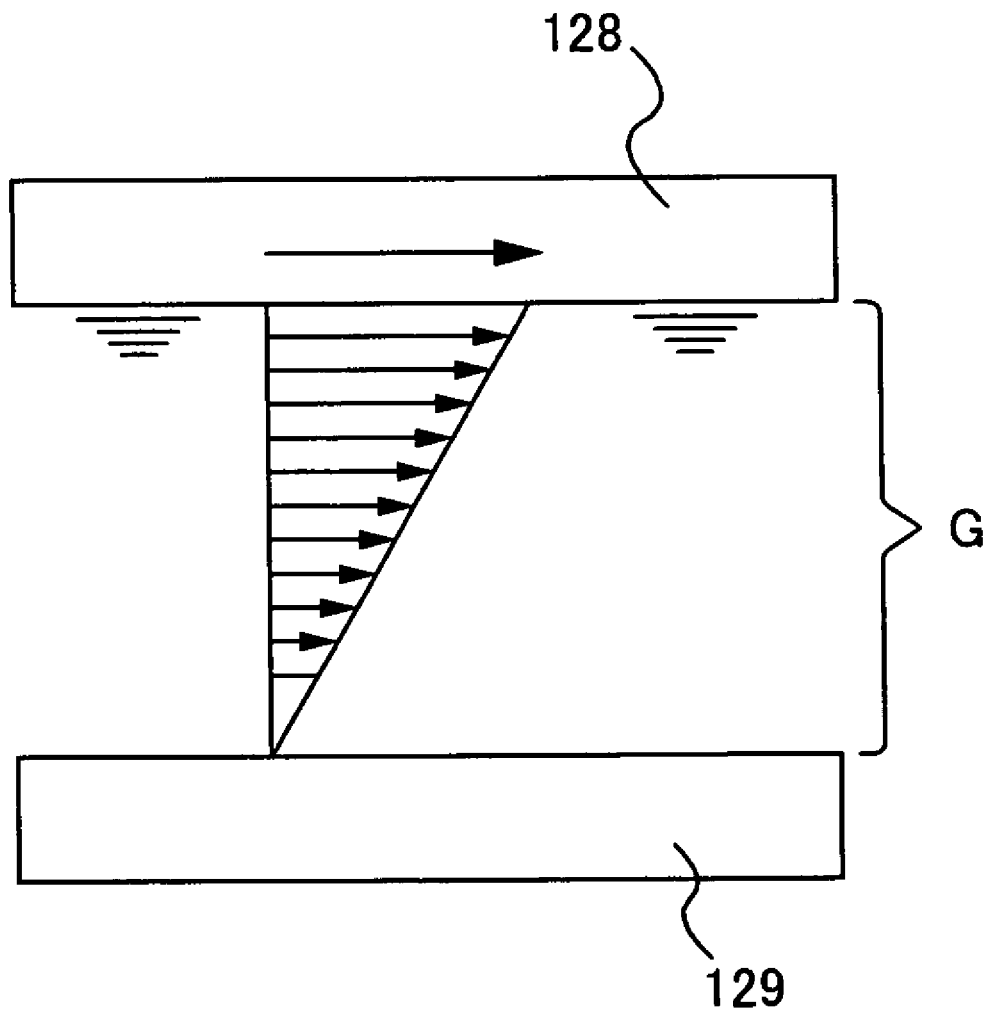
FIG. 7 is a conceptual diagram for describing the oil film damper.

This is conceptually illustrated in FIG. 7. When a viscous fluid is held in a predetermined gap G between two parallel flat plates 128 and 129 and one parallel flat plate 128 is moved relative to the other, then a velocity gradient such as that shown by arrows in the drawing occurs, and this leads to a force to be applied to the parallel flat plate 128 in the opposite direction of the relative movement. This force becomes the damping force that attenuates that relative movement.

Figure 8:
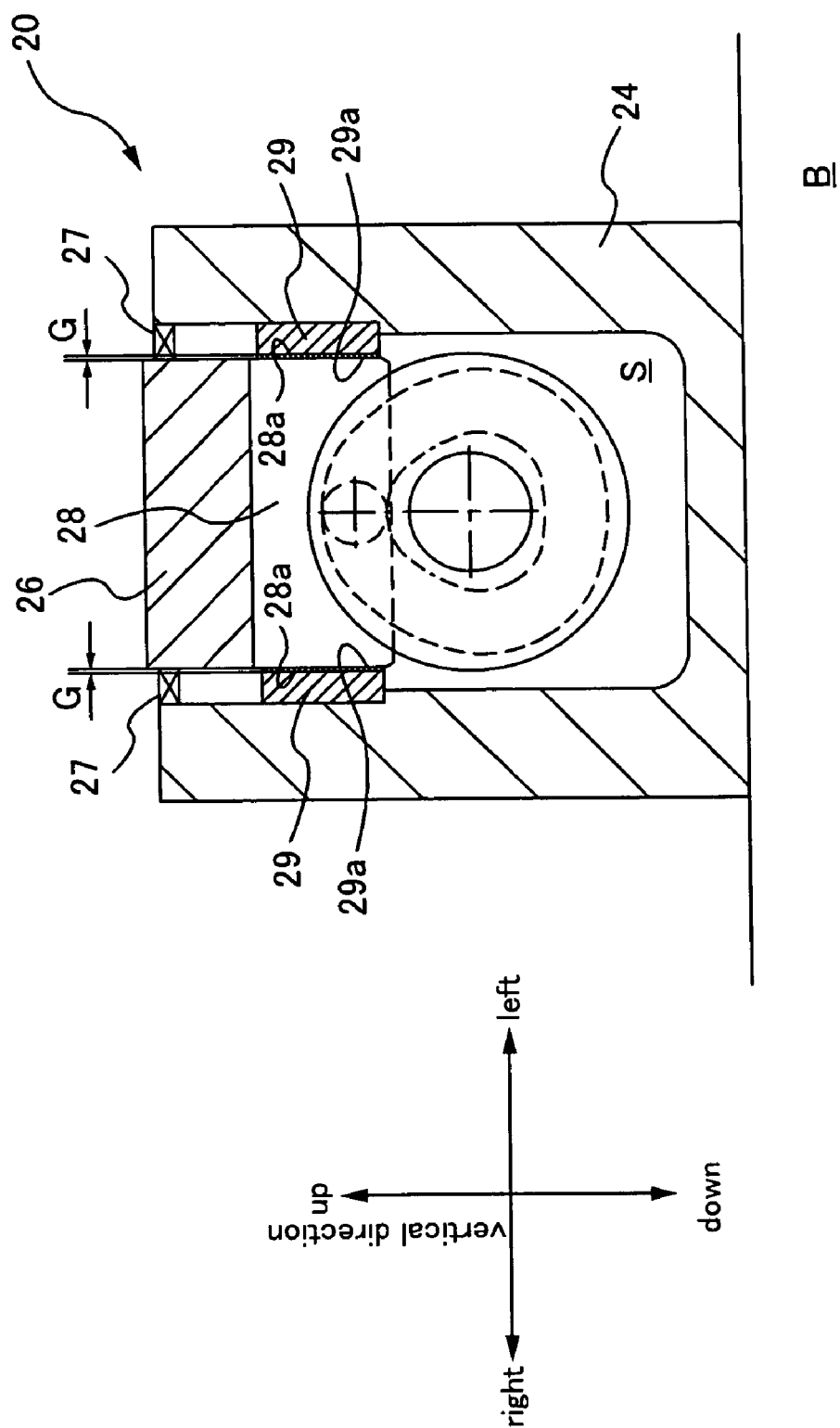
FIG. 8 is a vertical sectional view taken in the arrow direction along the line V—V in FIG. 3, and is for describing the oil film damper.

Here, in the first embodiment, a cam lubricant oil is filled into the internal space S of the housing 24 as mentioned above (see FIG. 4). Thus, as shown in FIG. 8, if a predetermined gap G is provided between the guide face 29a of the guide member 29 of the housing 24 and the end face 28a of the lift member 28 in opposition to that guide face 29a, then the gap G functions as an oil film damper when filled with the lubricating oil.

This oil film damper allows the deleterious vibration of the carry section itself that occurs for structural reasons such as bending deformation of the carry section 10 to be damped by the viscous resistance of the oil film. As a result, the intended vibration based on the cam mechanisms 30 and 60 can be applied to the carry section 10.

It should be noted that the gap G can be set from 0.005 mm to 0.05 mm. This is because setting the gap G to at least 0.005 mm allows physical contact between the guide face 29a and the end face 28a to be reliably prevented, and the oil film between the guide face 29a and the end face 28a effectively exhibits a damping action with respect to deleterious vibration. On the other hand, by setting the gap G to not more than 0.05 mm, shaking of the carry section 10 can be kept small.

Figure 9:
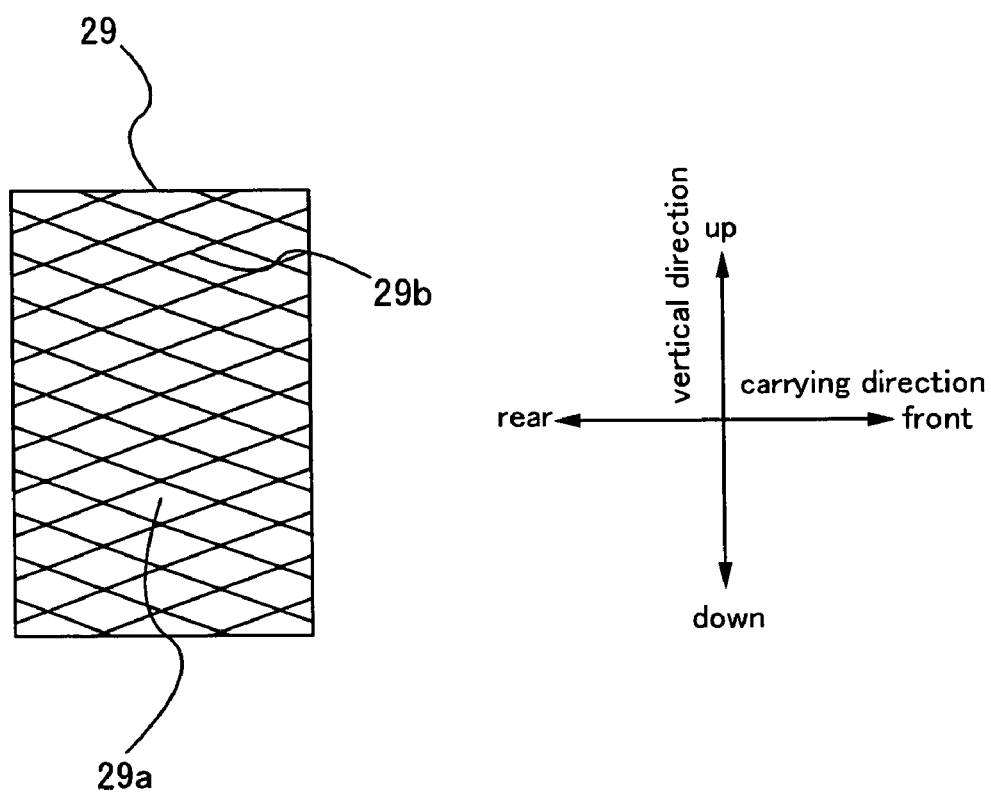
FIG. 9 shows an example of the formation pattern of the grooves formed in the guide face.

Further, it is preferable that multiple grooves are formed in at least one of either the groove faces 29a or the end faces 28a. In this way, the viscous fluid can be held favorably in the gaps by the grooves, and this allows an oil film damper to be reliably formed in the gaps. FIG. 9 shows an example of the formation pattern of these grooves. In this example, the grooves are formed in a diamond-shaped lattice in the guide faces 29a.

(3) Motion Path of Carry Section According to First Embodiment

Here, an example of the motion path of the carry section in the first embodiment is described. It should be noted that the motion path described here is achieved through the setting of the cam curves of the first cam and the second cam, and is an example in which high carrying ability is obtained. Consequently, there is no limitation whatsoever to this motion path, and depending on the setting of the cam curves, a motion path that corresponds to required parameters, such as the carrying capacity, can also be achieved.

Figure 10:
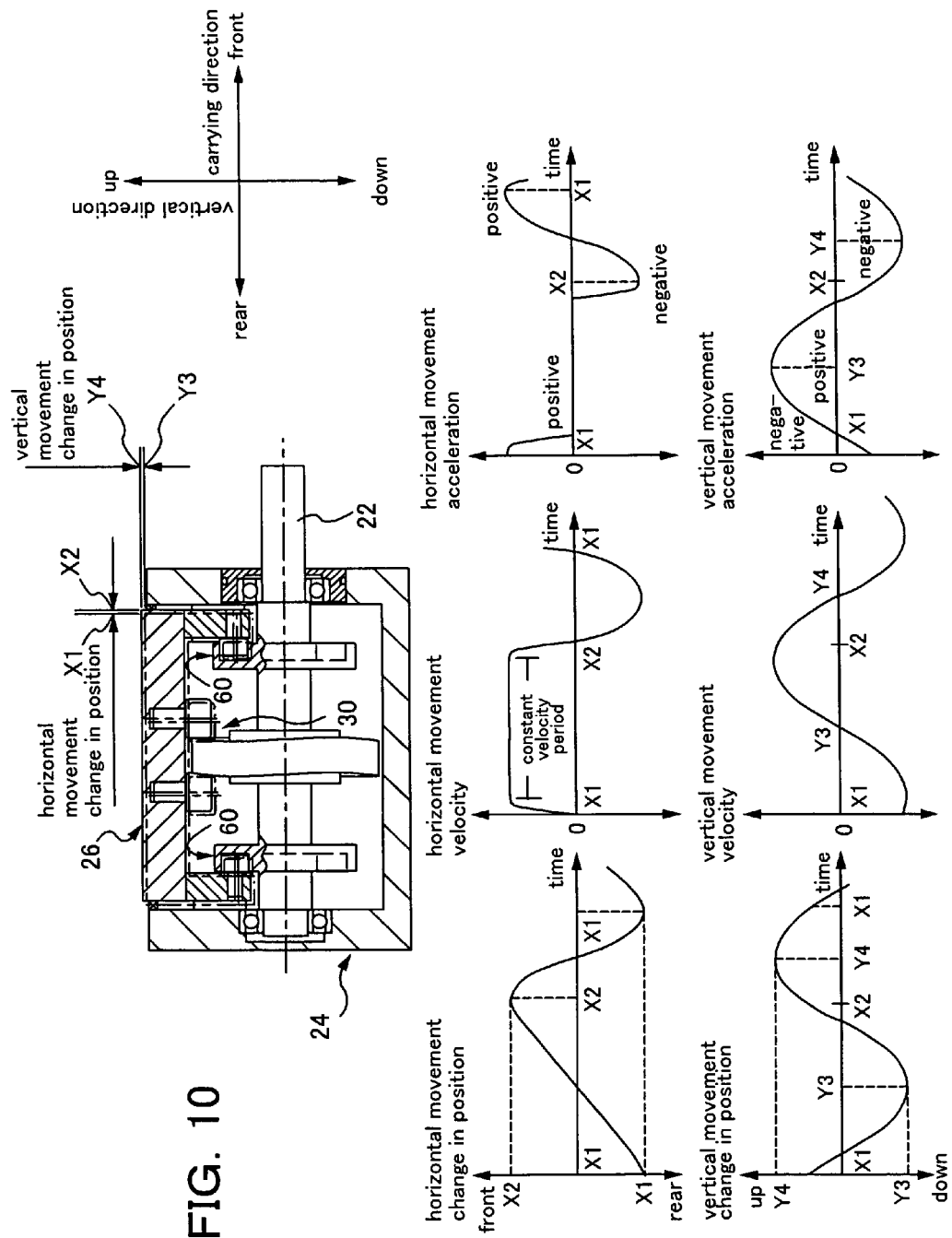
FIG. 10 is a diagram for describing an example of the motion path applied to the carry section by the vibration applying mechanism.

FIG. 10 is a diagram for describing an example of the motion path applied to the carry section by the vibration applying mechanism. The upper stage of FIG. 10 shows timing charts of horizontal movement, which is the reciprocating linear motion of the carrying direction, and the lower stage shows timing charts of vertical movement, which is the reciprocating linear motion of the vertical direction. The timing charts of the upper stage show, in order from the left, the horizontal movement position change versus time, the horizontal movement velocity versus time, and horizontal movement acceleration versus time. The timing charts of lower stage show, in order from the left, the vertical movement position change versus time, the vertical movement velocity versus time, and vertical movement acceleration versus time. It should be noted that the three upper stage figures and the three lower stage figures share identical time axes.

As discussed above, rotational motion is input to the input shaft and thus the first cam and the second cam are rotated, thereby causing the carry section 10 (not shown) formed integrally with the output section 26 to move horizontally and vertically and thus achieve the carrying operation.

The horizontal movement of the carry section 10 will be described first. As shown in FIG. 10, the carry section 10 performs reciprocating linear movement by moving forward in the carrying direction from the first position X1 to the second position X2 and moving rearward in the carrying direction from second position X2 to the first position X1. That is, it moves forward and rearward horizontally between the first position X1 and the second position X2 in the horizontal direction.

At this time, the time required for the carry section 10 to move forward from the first position X1 to the second position X2 is longer than the time required for the carry section 10 to move rearward from the second position X2 to the first position X1. Consequently, articles W (not shown) can be actively carried. This is because acceleration in the forward direction can be inhibited by increasing the time during which the carry section 10 moves forward, and thus relative sliding of the article W on the carry face 12a (not shown) with respect to the carry face 12a does not occur easily, and conversely, there is a large acceleration because the carry section 10 moves rearward rapidly, thereby making relative sliding of the article W on the carry face 12a with respect to the carry face 12a more easy to occur.

Further, as shown in FIG. 10, during horizontal movement, the carry section 10 is moved at constant velocity for a predetermined duration during the period from the start of movement forward from the first position X1 until arriving at the second position X2. Inertia due to acceleration of the carry section 10 does not act on the article W placed on the carry face 12a while the carry section 10 is moving at constant velocity, and thus the article W does not slide with respect to the carry face 12a. Consequently, relative sliding of the article W can be effectively inhibited at least during this period of constant velocity movement.

Next, vertical movement of the carry section 10 is described. As shown in FIG. 10, the carry section 10 is being lowered when it is positioned at the first position X1. The carry section 10 continues to be lowered until it arrives at a third position Y3, which is the lower limit position. After arriving at the third position Y3, the carry section 10 then begins to rise upward and arrives at the fourth position Y4, which is the upper limit position. In this way, the carry section 10 moves vertically in the up-down direction between the third position Y3 and the fourth position Y4.

The relationship between horizontal movement and vertical movement is described next. As shown in FIG. 10, when the upward velocity of the carry section 10 is increasing, that is, when the vertical movement acceleration is positive, then the carry section 10 is moving at constant velocity in the horizontal direction. Here, when the upward velocity of the carry section 10 is increasing, the article W on the carry face 12a is pushed to the carry face 12a. Further, when the carry section 10 is moving at constant velocity during reciprocating movement in the horizontal direction, the article does not experience inertia in the horizontal direction resulting from the acceleration of the carry section 10. Consequently, this allows relative sliding of the article W with respect to the carry section 10 to be reliably inhibited.

During horizontal movement, when the carry section 10 is moving rearward in the carrying direction, the downward velocity of the carry section 10 is increased, that is, the vertical movement acceleration is negative. Here, when the downward velocity of the carry section 10 is increasing, the contact pressure between the article W and the carry face 12a decreases, thereby reducing the friction. As a result, the article W can relatively slide over the carry face 12a with ease. Consequently, by increasing the downward velocity of the carry section 10 when the carry section 10 is moving to the rear during horizontal movement, it is possible to cause the article W to slide relative to the carry face 12a, and thus, the article is kept from moving rearward in the carrying direction. As a result, the article W can be favorably carried forward in the carrying direction.

Second Embodiment

Figure 11:
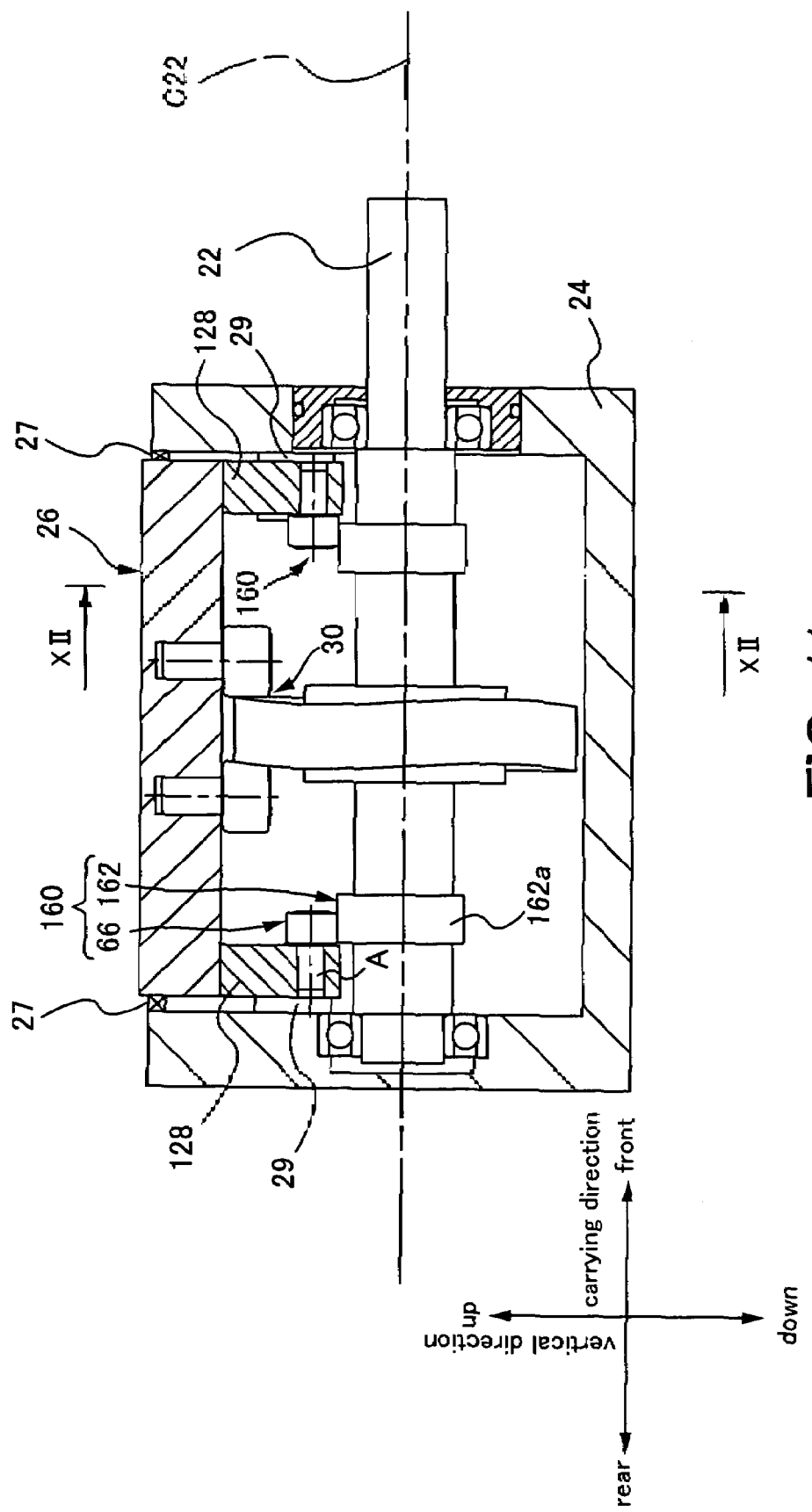
FIG. 11 is an explanatory diagram of the second embodiment, and is a vertical sectional view taken in the arrow direction along the line III—III in FIG. 2.
Figure 12B:
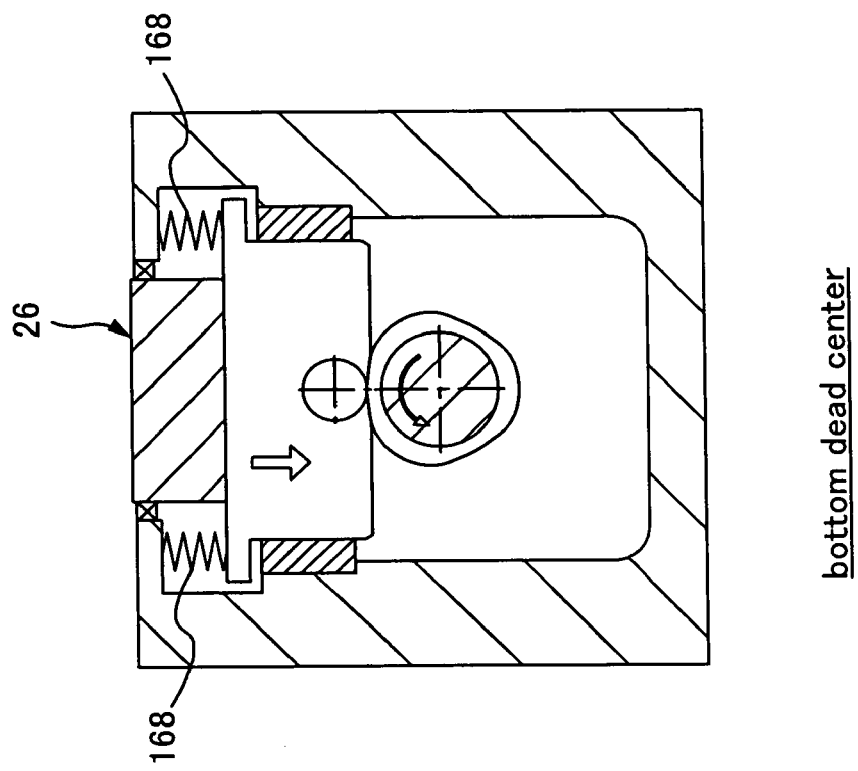
FIG. 12 is a vertical sectional view taken in the arrow direction along the line XII—XII in FIG. 11.
Figure 12A:
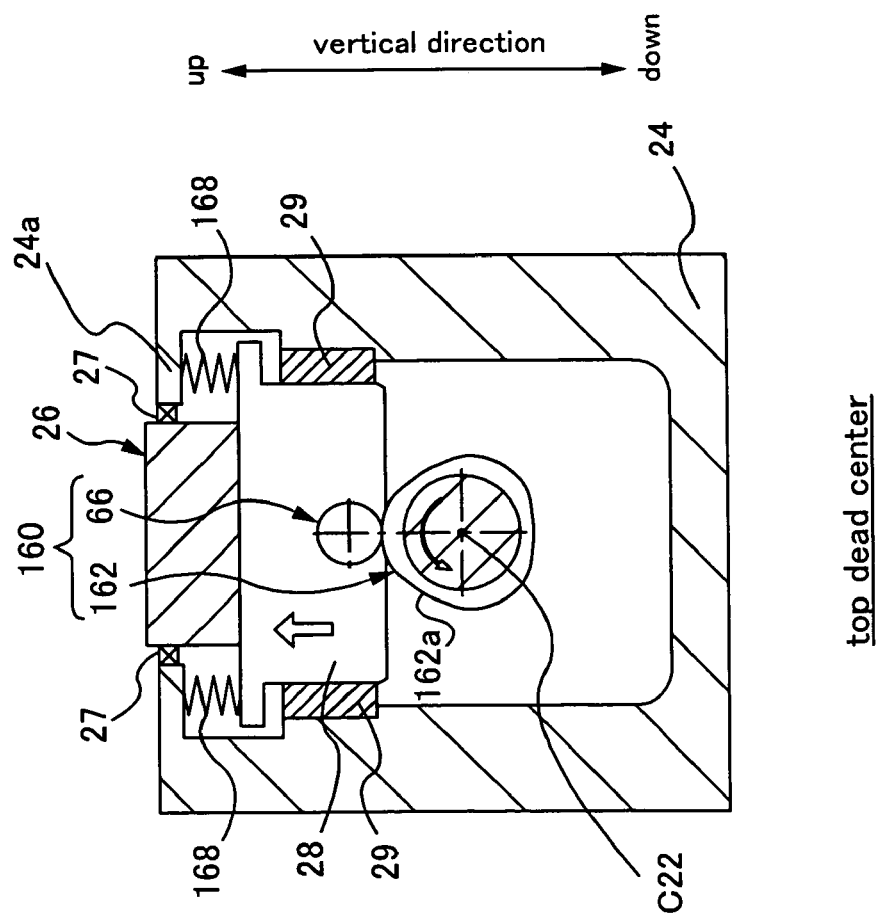

FIGS. 11 to 12B are explanatory diagram of an article carrying apparatus of a second embodiment. FIG. 11 is a vertical sectional view taken in the arrow direction along the line III—III in FIG. 2. FIGS. 12A and 12B are vertical sectional views taken in the arrow direction along the line XII—XII in FIG. 11, and these respectively show a state in which the output section is in a top dead center and a state in a bottom dead center in the vertical direction. It should be noted that in these figures, some portions are viewed from the side and from the above, respectively.

The second cam mechanism 60 of the first embodiment employed a face cam, but the second embodiment is different in that it employs a so-called plate cam. That is, as shown in FIG. 11 and FIG. 12A, a second cam mechanism 160 is provided with disk-shaped plate cams 162 as second cams each formed on the input shaft 22 and cam followers 66 serving as second followers that are provided on lift members 128 and engage the plate cams 162.

The outer circumferential face 162a of the plate cams 162 functions as the cam face. The radius from the axis C22 of the input shaft 22, which is its rotation axis, differs depending on the position in the circumferential direction, and thus a cam curve is expressed by this change in radius. On the other hand, the cam followers 66 are provided positioned with their rotation shaft A vertically above the rotation axis of the plate cams 162, and their outer circumferential faces are in contact with the outer circumferential faces 162a of the plate cams 162.

Consequently, when the plate cams 162 rotate together with the rotational motion of the input shaft 22, the cam followers 66 roll along the outer circumferential faces 162a of the plate cams 162 in conjunction with this rotation, and at this time, the cam followers 66 are moved in the vertical direction in correspondence with the change in the radius of the plate cam 162 with which they are in contact. As a result, naturally, the lift members 128 on which the cam followers 66 are provided, as well as the output section 26, also are moved in the vertical direction, and thus, the carry section 10 (not shown) fastened to the output section 26 performs reciprocating linear motion in the vertical direction in correspondence with the cam curve of the plate cams 162.

It should be noted that, as shown in FIG. 11, the outer circumferential faces 162a of the plate cams 162 are formed as curved surfaces that are parallel to the carrying direction, and the rotation axis of the outer ring R of the cam followers 66 is in the carrying direction. Thus, relative movement between the plate cams 162 and the cam followers 66 is restricted in the vertical direction but relative movement in the carrying direction is permitted. In other words, the cam followers 66 are capable of relative movement in the carrying direction while maintaining contact with the plate cams 162.

Consequently, as in the first embodiment, the cam followers 66 in contact with the outer circumferential faces 162a of the plate cams 162 can slide in the carrying direction with respect to the outer circumferential faces 162a even when the output section 26 is moved back and forth in the carrying direction, which is the first direction, by the first cam mechanism 30, and thus do not impede reciprocating movement in the carrying direction whatsoever. As a result, the output section 26 can quickly perform reciprocating linear motion in the carrying direction based on the first cam mechanism 30.

Also, as shown in FIG. 12A and FIG. 12B, it is preferable that an elastic member 168 such as a coil spring is interposed between the lower surface of the upper face wall 24a of the housing 24 and the upper surface of the lift members 128, to apply a downward pressing force to the cam followers 66 of the lift members 128.

This is because the second cam, being a plate cam, has the following drawback. That is, when moving upward during reciprocating linear motion in the vertical direction, the cam followers 66 are moved upward by being pressed upward by the plate cams 162 below them, and thus do not separate from the outer circumferential faces 162a, that is, the cam faces. When moving downward, however, gravity is the only downward pushing force acting on the cam followers 66. As a result, when moving downward, there is a possibility that the cam followers 66 will become separated from the outer circumferential faces 162a and no longer maintain contact with the cam faces. In such a case it would no longer be possible to apply the motion based on the cam curve to the output section.

Accordingly, in the example shown in FIGS. 12A and 12B, the elastic member 168 has been provided therebetween so that a downward pressing force is always applied to the cam followers 66, thereby keeping the cam followers 66 in constant contact with the plate cams 162.

Third Embodiment

Figure 13:
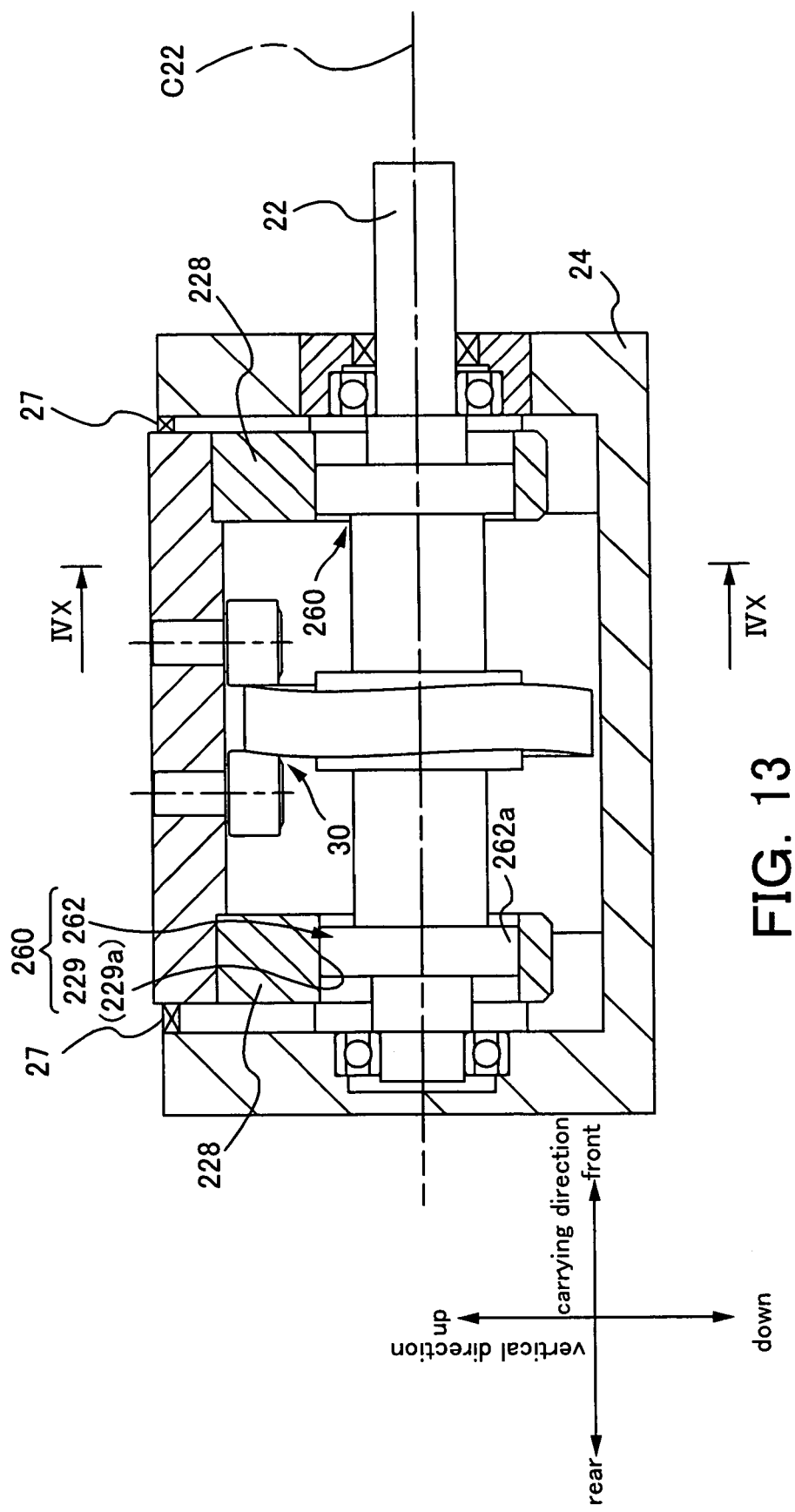
FIG. 13 is an explanatory diagram of the third embodiment, and is a vertical sectional view taken in the arrow direction along the line III—III in FIG. 2.
Figure 16A:
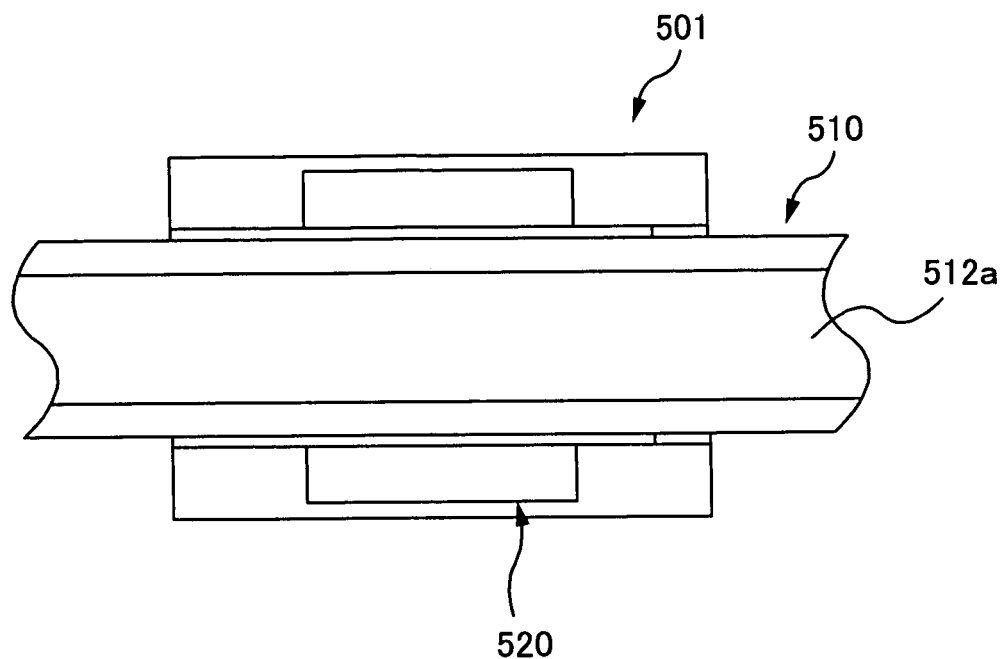
FIG. 16A shows a top view and FIG. 16B shows a lateral view.
Figure 16B:
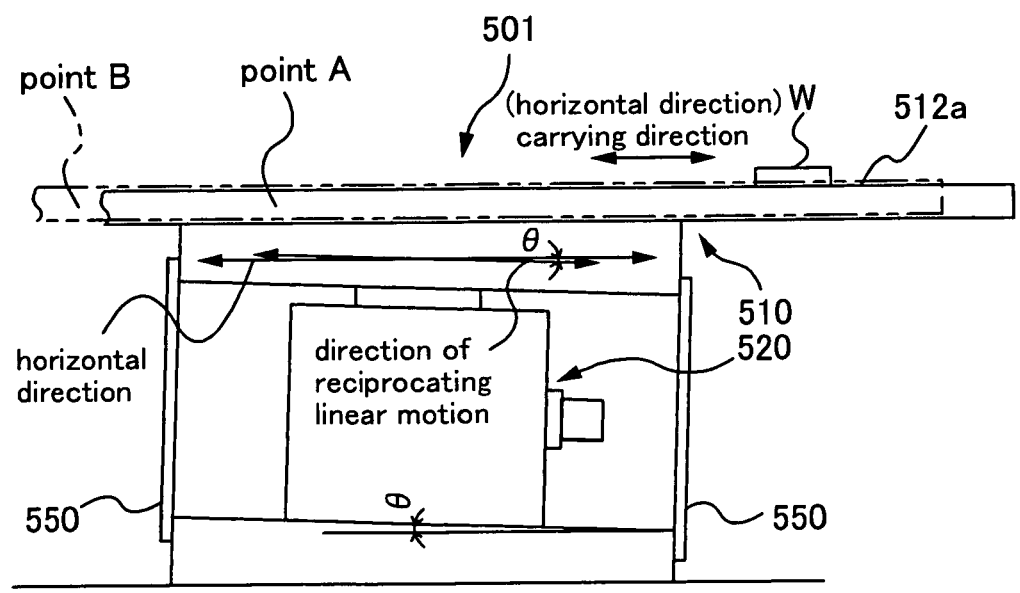
Figure 17:
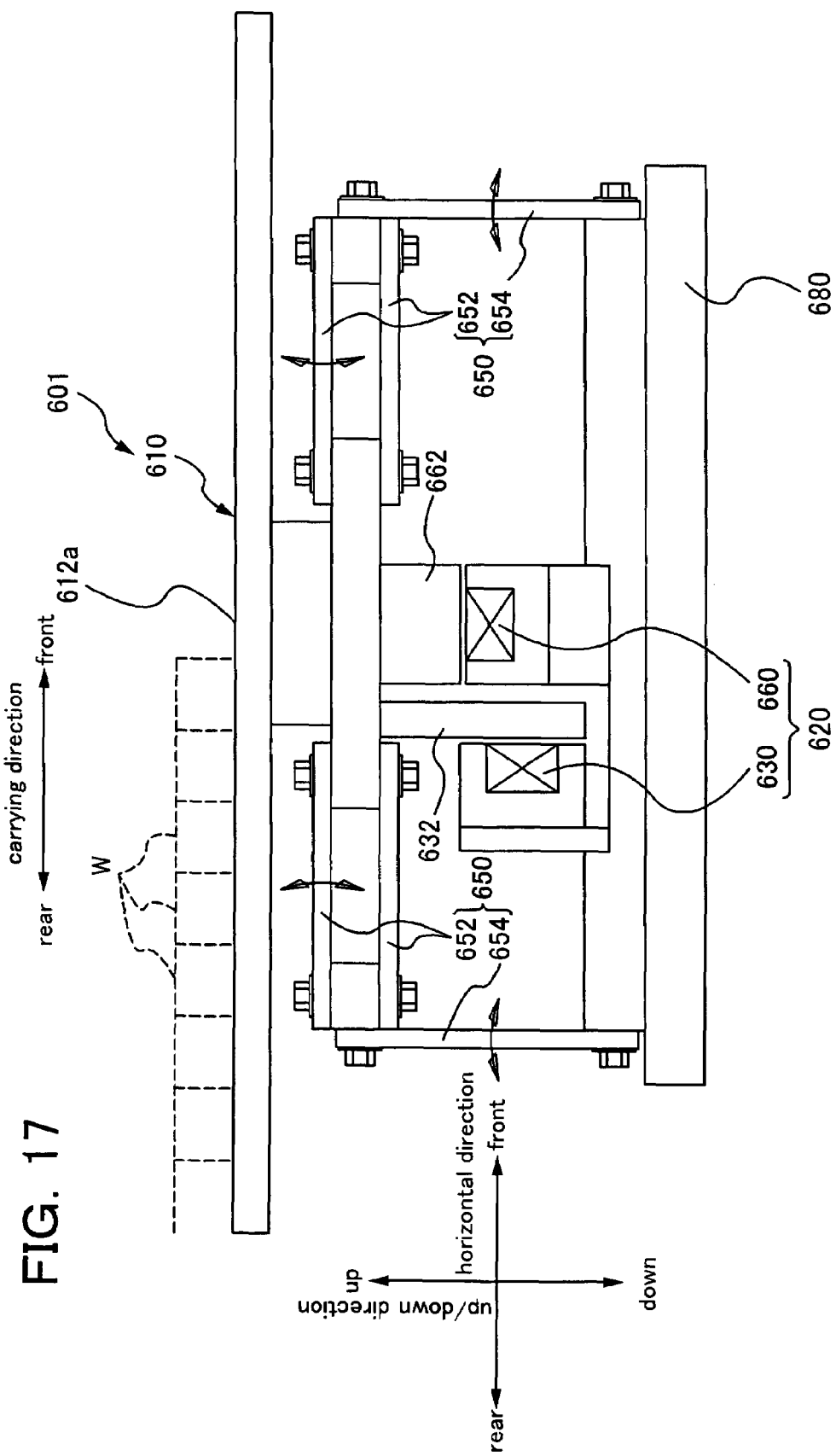
FIG. 17 is a lateral view of an article carrying apparatus according to a second conventional example.

FIGS. 13 through 14B are explanatory diagrams of an article carrying apparatus according to a third embodiment. It should be noted that these figures are depicted in the same way as FIGS. 11 to 12B for the second embodiment.

As shown in FIG. 13, the second cam mechanism of the third embodiment differs from the second cam mechanism 60 of the first embodiment in that it employs a so-called constant diameter cam instead of a face cam. That is, as shown in FIG. 13 and FIG. 14A, each second cam mechanism 260 is provided with a disk-shaped constant diameter cam 262 as a second cam formed on the input shaft 22, and a frame section 229 as a second follower that is formed in a lift member 228 and that engages the constant diameter cam 262.

As shown in FIG. 14A, each constant diameter cam 262 is a substantially disk-shaped member whose diameter is constant over its circumferential direction, and its outer circumferential face 262a functions as a cam face. That is, although its diameter is constant, its radius from the axis C22 of the input shaft 22, that is, its rotation axis, differs depending on the position in the circumferential direction, and thus a cam curve is expressed by this change in radius.

The frame sections 229 are substantially rectangular openings 229 formed in the lift members 228. The inner circumferential face 229a of the openings 229 face the outer circumferential faces 262a of the constant diameter cams 262, and the inner circumferential face 229a is disposed so as to sandwich the outer circumferential faces 262a at the two points 262b and 262c right above and right below the rotation axis.

Consequently, when the constant diameter cams 262 rotate together with the rotational motion of the input shaft 22, then in conjunction with this rotation, the frame sections 229, while sandwiching the outer circumferential faces 262a of the constant diameter cams 262 at the two points 262b and 262c, are moved in the vertical direction in correspondence with the change in radius of the outer circumferential faces 262a being sandwiched. Then, naturally, the lift members 228 having the frame sections 229, as well as the output section 26, also are moved in the vertical direction, and as a result, the carry section (not shown) fastened to the output section 26 performs reciprocating linear motion in the vertical direction in correspondence with the cam curve of the constant diameter cams 262.

It should be noted that as shown in FIG. 13, the outer circumferential faces 262a of the constant diameter cams 262 are formed as curved surfaces that are parallel to the carrying direction, and the inner circumferential faces 229a of the frame sections 229 also are formed as surfaces parallel to the carrying direction. Thus, relative movement in the vertical direction between the constant diameter cams 262 and the frame sections 229 is restricted but relative movement therebetween in the carrying direction is permitted. In other words, the frame sections 229 are capable of relative movement in the carrying direction while maintaining contact with the constant diameter cams 262 at the two points 262b and 262c in the vertical direction.

Consequently, as in the first embodiment, the frame sections 229 in contact with the outer circumferential faces 262a of the constant diameter cams 262 can slide in the carrying direction with respect to the outer circumferential faces 262a even when the output section 26 is moved back and forth in the carrying direction, which is the first direction, by the first cam mechanism 30, and thus do not impede this reciprocating movement in the carrying direction whatsoever. As a result, the output section 26 can quickly perform reciprocating linear motion in the carrying direction based on the first cam mechanism 30.

Also, as shown in FIG. 14A and FIG. 14B, the frame sections 229 sandwich the constant diameter cams 262 at two points 262b and 262c in the vertical direction. Consequently, the change in radius of the constant diameter cams 262 can be reliably transmitted to the output section 26, for both upward and downward reciprocating movements in the vertical direction. Thus, the vibration as expressed by the cam curve of the constant diameter cams 262 can be applied to the carry section 10 without being significantly affected by "backlash."

Other Embodiments

Embodiments of the present invention were described above, but the present invention is not limited to these embodiments, and modifications such as the following also are possible.

In the above implementations, only a single first cam mechanism 30 was provided in a substantially central portion in the carrying direction. However, the number provided and the location(s) provided are not limited to this, and it is also possible to provide a plurality of first cam mechanisms 30 or to provided the first cam mechanism 30 at end portions in the carrying direction. However, when only a single first cam mechanism 30 is provided, then from the perspective of front/rear symmetry in the carrying direction, it is preferably provided at a substantially central portion as shown in FIG. 3.

In the foregoing implementations, two second cam mechanisms 60 are respectively provided at the front end portion and the rear end portion in the carrying direction. However, the number provided and the location(s) provided are not limited to this, and it is also possible to provide a single second cam mechanism 60 or three or more second cam mechanisms 60, and the second cam mechanism(s) 60 can also be provided in a substantially central portion in the carrying direction. However, from the standpoint of stability in supporting the output section 26, it is preferable that at least two are furnished to provide multiple point support at two or more points, and it is preferable that they are disposed as far apart as possible.

What is claimed is:

1. An article carrying apparatus for carrying, in a carrying direction, an article placed on a carry face of a carry section making use of a vibration, comprising:

said carry section provided with said carry face of which said carrying direction is linearly restricted; and a vibration applying mechanism that applies said vibration to said carry section, said vibration applying mechanism including:

a first cam mechanism for converting a motion that has been input from a predetermined drive source into a reciprocating linear motion in a first direction that has at least a component in said carrying direction, and for transmitting said reciprocating linear motion to said carry section, said first cam mechanism comprises a first cam formed integrally with said input shaft, and a first cam-following element that is provided on said output section and engages with said first cam to allow relative movement in said second direction with respect to said first cam but restrict relative movement in said first direction;

a second cam mechanism for converting a motion that has been input from a predetermined drive source into a reciprocating linear motion in a second direction that has at least a component in a normal direction of said carry face, and for transmitting said reciprocating linear motion to said carry section, said second cam mechanism has a second cam formed integrally with said input shaft, and a second cam-following element that is provided on said output section and engages with said second cam to allow relative movement in said first direction with respect to said second cam but restrict relative movement in said second direction, an output section for transmitting the reciprocating linear motions to said carry section while supporting said carry section;

a housing that guides said output section such that said output section moves within a plane defined by said first direction and said second direction; and a single input shaft that is rotatably supported on said housing for inputting the motion from said drive source as a rotational motion, wherein the reciprocating linear motion in said first direction has only the component in said carrying direction; and wherein the reciprocating linear motion in said second direction has only the component in said normal direction.

2. An article carrying apparatus according to claim 1, wherein said input shaft is arranged with its axial direction in said carrying direction;

wherein said first cam is a rib cam in which a position of formation, with respect to said axial direction, of a rib formed on an outer circumference of said input shaft changes along a circumferential direction; and wherein said first cam-following element is constituted by at least two cam followers that sandwich both lateral faces of said rib and that roll along the lateral faces.

3. An article carrying apparatus according to claim 2, wherein said second cam is a face cam formed on the outer circumference of said input shaft; and
wherein said second cam-following element is a cam follower that fits into an annular groove formed in an end face of said face cam and rolls along an inner face of said annular groove.

4. An article carrying apparatus according to claim 3, wherein said second cam is provided in at least two locations in the axial direction of said input shaft.

5. An article carrying apparatus according to claim 2, wherein said second cam is a plate cam formed on the outer circumference of said input shaft; and
wherein said second cam-following element is a cam follower that rolls along an outer circumferential face of said plate cam which serves as a roll face.

6. An article carrying apparatus according to claim 5, wherein an elastic member for pressing said output section toward said plate cam such that an outer circumferential face of said cam follower comes into contact with the outer circumferential face of said plate cam is interposed between said housing and said output section.

7. An article carrying apparatus according to claim 2, wherein said second cam is a constant diameter cam that is formed on the outer circumference of said input shaft and whose diameter is constant over its circumferential direction;
wherein said second cam-following element is a frame section disposed with its inner circumferential face facing an outer circumferential face of said constant diameter cam; and
wherein said constant diameter cam is sandwiched by the inner circumferential face of said frame section at both end portions in said second direction of its outer circumferential face, and rotates along with the rotation of said input shaft about an axis of said input shaft.

8. An article carrying apparatus for carrying, in a carrying direction, an article placed on a carry face of a carry section making use of a vibration, comprising:
said carry section provided with said carry face of which said carrying direction is linearly restricted; and
a vibration applying mechanism that applies said vibration to said carry section, said vibration applying mechanism including:
a first cam mechanism for converting a motion that has been input from a predetermined drive source into a reciprocating linear motion in a first direction that has at least a component in said carrying direction, and for transmitting said reciprocating linear motion to said carry section;
a second cam mechanism for converting a motion that has been input from a predetermined drive source into a reciprocating linear motion in a second direction that has at least a component in a normal direction of said carry face, and for transmitting said reciprocating linear motion to said carry section;
an output section for transmitting the reciprocating linear motions to said carry section while supporting said carry section;
a housing that guides said output section such that said output section moves within a plane defined by said first direction and said second direction; and
a single input shaft that is rotatably supported on said housing for inputting the motion from said drive source as a rotational motion;
wherein said housing has a guide face for guiding said output section such that said output section moves within said plane; and
wherein a viscous fluid is held in a gap between said guide face and a portion of said output section that is in opposition to said guide face.

9. An article carrying apparatus according to claim 8, wherein said gap is set from 0.005 mm to 0.05 mm.

10. An article carrying apparatus according to claim 8, wherein multiple grooves are formed in at least one of said guide face and the portion of said output section that is in opposition to said guide face.

11. An article carrying apparatus for carrying, in a carrying direction, an article placed on a carry face of a carry section making use of a vibration, comprising:
said carry section provided with said carry face of which said carrying direction is linearly restricted; and
a vibration applying mechanism that applies said vibration to said carry section, said vibration applying mechanism including:
a first cam mechanism for converting a motion that has been input from a predetermined drive source into a reciprocating linear motion in a first direction that has at least a component in said carrying direction, and for transmitting said reciprocating linear motion to said carry section; and
a second cam mechanism for converting a motion that has been input from a predetermined drive source into a reciprocating linear motion in a second direction that has at least a component in a normal direction of said carry face, and for transmitting said reciprocating linear motion to said carry section;
wherein the reciprocating linear motion in said first direction has only the component in said carrying direction, and said carrying direction is in a horizontal direction; and
wherein the reciprocating linear motion in said second direction has only the component in said normal direction, and said normal direction is in a vertical direction.

12. An article carrying apparatus according to claim 11, wherein, when said carry section is moved, due to the reciprocating linear motion in said carrying direction, from a first position to a second position forward of said first position in said carrying direction, and moved from said second position to said first position, a time required to move from said first position to said second position is longer than a time required to move from said second position to said first position.

13. An article carrying apparatus according to claim 12, wherein during movement of said carry section from said first position to said second position, said carry section moves at a constant velocity in said carrying direction for a predetermined duration.

14. An article carrying apparatus according to claim 12, wherein, when an upward velocity of said carry section is increasing due to the reciprocating linear motion in said vertical direction, said carry section moves at a constant velocity during movement of said carry section from said first position to said second position.

15. An article carrying apparatus according to claim 14, wherein during movement of said carry section from said second position to said first position, a downward velocity of said carry section increases.

16. An article carrying apparatus for carrying, in a carrying direction, an article placed on a carry face of a carry section making use of a vibration, comprising:

said carry section provided with said carry face of which said carrying direction is linearly restricted; and a vibration applying mechanism that applies said vibration to said carry section, said vibration applying mechanism including:

a first cam mechanism for converting a motion that has been input from a predetermined drive source into a reciprocating linear motion in a first direction that has at least a component in said carrying direction, and for transmitting said reciprocating linear motion to said carry section;

a second cam mechanism for converting a motion that has been input from a predetermined drive source into a reciprocating linear motion in a second direction that has at least a component in a normal direction of said carry face, and for transmitting said reciprocating linear motion to said carry section;

an output section for transmitting the reciprocating linear motions to said carry section while supporting said carry section;

a housing that guides said output section such that said output section moves within a plane defined by said first direction and said second direction; and a single input shaft that is rotatably supported on said housing for inputting the motion from said drive source as a rotational motion;

wherein said first cam mechanism has a first cam formed integrally with said input shaft, and a first cam-following element that is provided on said output section; and wherein said first cam has a cam face that, during reciprocating movement of said output section in said second direction, maintains contact with said first cam-following element of said output section and in which the point of contact moves in the same direction as said second direction.

17. An article carrying apparatus for carrying, in a carrying direction, an article placed on a carry face of a carry section making use of a vibration, comprising:

said carry section provided with said carry face of which said carrying direction is linearly restricted; and vibration applying mechanism that applies said vibration to said carry section, said vibration applying mechanism including:

a first cam mechanism for converting a motion that has been input from a predetermined drive source into a reciprocating linear motion in a first direction that has at least a component in said carrying direction, and for transmitting said reciprocating linear motion to said carry section;

a second cam mechanism for converting a motion that has been input from a predetermined drive source into a reciprocating linear motion in a second direction that has at least a component in a normal direction of said carry face, and for transmitting said reciprocating linear motion to said carry section;

an output section for transmitting the reciprocating linear motions to said carry section while supporting said carry section;

a housing that guides said output section such that said output section moves within a plane defined by said first direction and said second direction; and a single input shaft that is rotatably supported on said housing for inputting the motion from said drive source as a rotational motion;

wherein said second cam mechanism has a second cam formed integrally with said input shaft, and a second cam-following element that is provided on said output section; and wherein said second cam has a cam face that, during reciprocating movement of said output section in said first direction, maintains contact with said second cam-following element of said output section and in which the point of contact moves in the same direction as said first direction.

* * * * *